United States Patent [19]

Adachi et al.

[11] Patent Number: 5,558,596
[45] Date of Patent: Sep. 24, 1996

[54] METHOD AND SYSTEM USING FUZZY LOGIC FOR CONTROLLING A CVT TRANSMISSION

[75] Inventors: Masao Adachi, Zama; Makoto Shioya, Suginami-ku; Kazuhiko Sato; Minoru Ohkubo, both of Katsuta, all of Japan

[73] Assignees: Hitachi, Ltd., Tokyo, Japan; Hitachi Automotive Engineering Company, Ibaraki-ken, Japan

[21] Appl. No.: 328,535

[22] Filed: Oct. 25, 1994

Related U.S. Application Data

[63] Continuation of Ser. No. 794,038, Nov. 19, 1991, abandoned.

[30] Foreign Application Priority Data

Nov. 19, 1990 [JP] Japan ................................. 2-311507

[51] Int. Cl.⁶ ................................................ B60K 41/12
[52] U.S. Cl. ............................. 477/46; 477/48; 264/424.1
[58] Field of Search ................................ 477/45, 46, 48, 477/49; 364/424.1

[56] References Cited

U.S. PATENT DOCUMENTS

| | | | |
|---|---|---|---|
| 4,841,815 | 6/1989 | Takahashi | 364/424.1 X |
| 4,890,516 | 1/1990 | Suzuki | 477/46 |
| 5,036,730 | 8/1991 | Sakai et al. | 364/424.1 X |
| 5,079,704 | 1/1992 | Sakai et al. | 364/424.1 |
| 5,101,350 | 3/1992 | Tokoro | 364/424.1 |
| 5,124,916 | 6/1992 | Tokoro et al. | 364/424.1 |
| 5,131,297 | 7/1992 | Yamashita et al. | 364/424.1 X |
| 5,161,433 | 11/1992 | Sakakibara et al. | 364/424.1 X |
| 5,166,877 | 11/1992 | Ishikawa et al. | 364/424.1 |
| 5,175,685 | 12/1992 | Hibi | 477/46 X |
| 5,214,983 | 6/1993 | Kobayashi et al. | 364/424.1 X |

FOREIGN PATENT DOCUMENTS 63-269744 8/1988 Japan.

OTHER PUBLICATIONS

*Prototype Design and Testing of the Half Toroidal CVT*, Hisashi Machida and Nobuhide Kurachi, Trilogy R&D, Nippon Seiko K. K., SAE 900552 (1990).

"Electronically Controlled Continuously Variable Transmission (ECVT–II)", International Congress on Transporation Electronics Proceedings, Y. Kasai, Y. Morimoto, Oct. 17–18, 1988, pp. 33–42.

*Primary Examiner*—Khoi Q. Ta
*Attorney, Agent, or Firm*—Antonelli, Terry, Stout & Kraus

[57] ABSTRACT

According to the present invention, the driver's operation quantity and the vehicle running status are measured, the target value of speed ratio or the target value of revolution speed on the input side of the transmission is determined on the basis of the above measured values, and the speed ratio is changed using different algorithms (particularly fuzzy rules) on the basis of the magnitude of deviation between the target value and the actual value.

Furthermore, when a vehicle has a continuously variable transmission, a change of at least one of the vehicle acceleration and the shaft torque of a drive wheel is predicted, the engine output torque is controlled on the basis of the prediction, and finite speed ratio characteristics or intermediate characteristics between finite speed ratio characteristics and continuously variable speed ratio characteristics are controlled for the continuously variable transmission. By doing this, speed ratio control stressed on stability is available when the absolute value of the above deviation is small, while speed ratio control stressed on rapid response and smooth acceleration variation is available when the absolute value of the deviation is large.

Furthermore, a smooth acceleration feeling and a rapid acceleration response can be realized, the maneuverability is improved, and the driver can find pleasure in more speed ratio characteristics.

6 Claims, 32 Drawing Sheets

(FIRST EMBODIMENT)
— BASED ON THE PRESENT INVENTION
······ BASED ON CONVENTIONAL CONTROL (SECOND EMBODIMENT)
— BASED ON THE PRESENT INVENTION
······ BASED ON CONVENTIONAL CONTROL

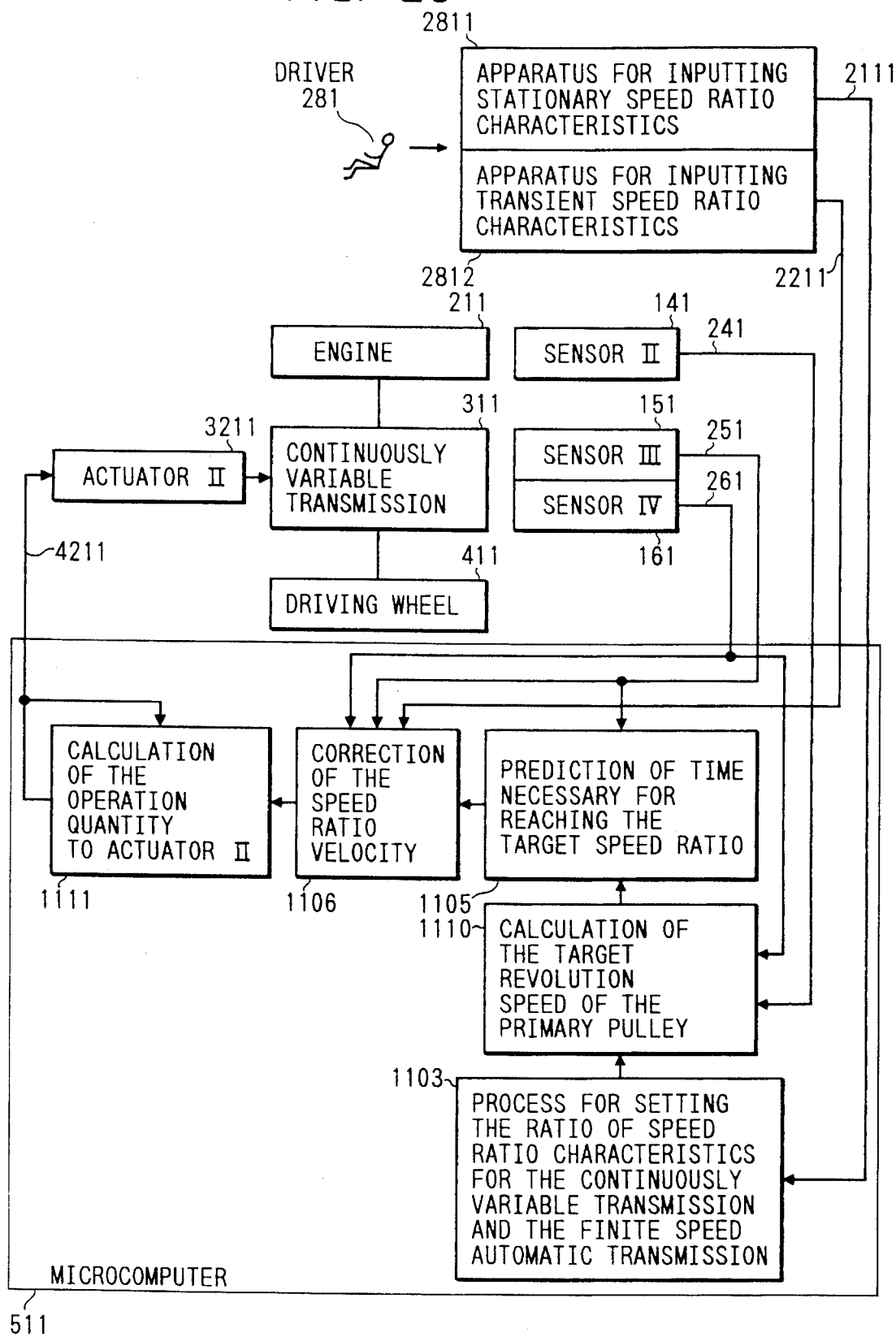

METHOD AND SYSTEM USING FUZZY LOGIC FOR CONTROLLING A CVT TRANSMISSION

This application is a continuation of Ser. No. 07/794,038, filed Nov. 19, 1991, now abandoned.

BACKGROUND OF THE INVENTION

1. Field of the Invention

The present invention relates to a method and system for controlling a vehicle transmission for realizing smoothing of acceleration and deceleration and efficiently using the power source energy, thereby realizing desired feeling of acceleration and deceleration.

2. Description of the Prior Art

The conventional speed ratio control method of a transmission is described in International Congress On Transportation Electronics Processings (1988), pp 33 to 42 (hereinafter referred to as Prior Art 1). In the present invention, the target speed ratio is determined from the real speed ratio, engine throttle opening, and vehicle velocity, and the speed ratio variation velocity is determined from the following expression:

Speed ratio variation velocity = factor 1 × (target speed ratio − real speed ratio) + factor 2 × target speed ratio variation velocity and the speed ratio is controlled so that the real speed ratio variation velocity matches this speed ratio variation velocity. The factor 1 of the above expression is changed by fuzzy logic rules depending on the vehicle velocity and engine throttle opening. The factor 2 is changed by fuzzy logic rules depending on the "target speed ratio—real speed ratio" and target speed ratio variation velocity. Changing the speed ratio characteristics of a continuously variable transmission is described in Japanese Patent Application Laid-Open No. 1988-269744 (hereinafter referred to as Prior Art 2).

In the above Prior Art 1, the user can set desirable speed ratio characteristics by inputting of the relational curve between vehicle velocity and engine speed, and selecting one of "fast", "medium", and "slow" of the speed ratio variation velocity.

In the above Prior Arts 1 and 2, synchronization between the time that the deviation becomes 0 and the time that the speed ratio control actuator stops speed ratio change, use of vehicle acceleration information, and engine control are not considered, and there are problems imposed such as unsmooth changes of acceleration and overshoot of engine speed. The easiness of maneuverability is not considered, and there is a problem imposed such that when the throttle opening is changed, the speed ratio is changed always and the engine speed changes widely.

SUMMARY OF THE INVENTION

The first object of the present invention is to provide a speed ratio control method and system for realizing smooth acceleration variations and preventing wasting of energy of the power source due to engine speed overshoot or large variations of the input side revolution speed of a transmission.

The second object of the present invention is to provide a control method and system for realizing smooth acceleration variations and rapid acceleration and deceleration response by engine control.

In the above Prior Art 2, the easiness of maneuverability is not considered, and hence there is a problem imposed such that when changing a vehicle with a finite speed automatic transmission to a vehicle with a continuously variable transmission, a feeling of uneasiness occurs in the riding comfort. Furthermore, a means for continuously changing the speed ratio variation velocity is not considered, and hence there is a problem imposed such that the transient speed ratio characteristics cannot be changed as desired.

The third object of the present invention is to provide a speed ratio control method and system for minimizing the above feeling of uneasiness in the riding comfort due to vehicle changing and a speed ratio control method and system for finding pleasure in more speed ratio characteristics.

The fourth object of the present invention is to provide a speed ratio control method and system for changing the speed ratio variation velocity characteristics continuously as desired by an instruction of the driver.

In the above prior arts, changes of the vehicle response characteristics due to changes of the running resistance such as the number of passengers and road gradient and output reduction of the engine caused by atmospheric pressure changes are not considered, and the speed ratio is always controlled by a constant control parameter. Therefore, there is a problem imposed such that a sufficient acceleration feeling cannot be obtained for a rapid acceleration response cannot be obtained.

The fifth object of the present invention is to provide a speed ratio control method and system for a continuously variable transmission for providing no feeling of a reduction of the acceleration force for the same vehicle velocity and throttle opening under the conditions that the above vehicle response characteristics are changed.

The sixth object of the present invention is to provide a speed ratio control method and system for a continuously variable transmission wherein the acceleration and deceleration response satisfies the contrary conditions of shortening of the response time and prevention of down-shock (negative derivative of acceleration force generated during acceleration) and is smooth and quick.

The seventh object of the present invention is to provide a speed ratio control method and system for a continuously variable transmission by calculating variations of the target acceleration response or speed ratio control parameter for being adaptive finely to various vehicle velocities and throttle openings or changes of the vehicle response characteristics.

So as to accomplish the above objects, the present invention changes the speed ratio according to different algorithms (for example, different fuzzy rules) on the basis of the magnitude of the deviation between the target value and the real value. So as to provide smooth acceleration changes, when the absolute value of the deviation is large the present invention changes the speed ratio on the basis of at least one of the ratio between the predicting time until the deviation becomes 0 and the predicting response time necessary for stopping the speed ratio change by the speed ratio control actuator, the difference thereof, and the vehicle derivative of acceleration.

Furthermore, so as to prevent wasting of energy of the power source and maintain the stability of the transmission system, the present invention changes the speed ratio on the basis of the deviation and deviation variation velocity when the absolute value of the deviation is small and inhibits to change the speed ratio when both the deviation and the acceleration pedal position variation velocity are small.

Next, a structure (second structure) which is a modification of the above mentioned structure of the present invention for realizing both smooth acceleration variation and acceleration and deceleration rapid response mentioned above controls the engine output torque by providing processing for predicting a change of at least one of the vehicle acceleration and the axial torque of the drive wheel. Furthermore, the structure uses fuzzy logic for control of the engine output on the basis of the variation prediction processing. The variation prediction processing uses information of the speed ratio, transmission input side revolution speed and engine revolution speed, or information of throttle opening, and vehicle derivative of acceleration.

The third structure of the present invention, which is suitable for minimizing the above feeling of uneasiness due to vehicle changing, provides processing for setting or selecting speed ratio characteristics of a finite speed automatic transmission in a continuously variable transmission so as to improve the easiness of maneuverability of a vehicle with a continuously variable transmission and to find pleasure in more speed ratio characteristics.

Furthermore, the structure provides processing for setting or selecting any speed ratio characteristics continuously between the finite speed ratio characteristics and the continuously variable speed ratio characteristics.

The fourth structure of the present invention, which is suitable for providing the above transient speed ratio characteristics according to the user's desire, provides processing for correcting the speed ratio velocity using prediction information necessary for reaching the target speed ratio on the basis of the user's instruction.

The fifth structure of the present invention, which is suitable for the object of providing no feeling of a reduction of the acceleration force for the same vehicle velocity and throttle opening, provides processing for calculating the target acceleration response in accordance with the vehicle velocity and throttle opening, processing for comparing the calculated target acceleration response with the measured acceleration response, and processing for changing the speed ratio control parameter on the basis of the comparison result information.

A structure (sixth structure) of the present invention, which is suitable for accomplishing the above sixth object, performs the comparison processing using the index value of the acceleration response time and the index value of the acceleration down-shock magnitude.

The seventh structure of the present invention, which is suitable for accomplishing the above seventh object, uses fuzzy logic for at least one of calculation of the target acceleration response and changing of the speed ratio control parameter.

According to the above structures of the present invention, the speed ratio is changed by different fuzzy rules or algorithms on the basis of the magnitude of the deviation. Therefore, speed ratio control which stresses stability is available when the absolute value of the deviation is small, while speed ratio control which attaches importance to a rapid response and smooth acceleration variation is available when the absolute value of the deviation is large. By doing this, smooth acceleration variation is realized, and the speed ratio and engine revolution speed are prevented from overshooting.

Especially when the absolute value of the deviation is large, the speed ratio is changed by the fuzzy logic rules on the basis of the ratio or difference between the predicting time until the deviation becomes 0 and the predicting response time necessary for stopping the speed ratio change by the speed ratio control actuator. Therefore, sudden changes of the acceleration due to excessive speed ratio variations or overshooting of the speed ratio can be prevented and the acceleration is changed smoothly. When the absolute value of the deviation is large, the speed ratio is changed by the fuzzy logic rules on the basis of the derivative of acceleration. Therefore, a decrease in the acceleration during acceleration or an increase in the acceleration during deceleration can be prevented and the acceleration is changed smoothly. When the absolute value of the deviation is small, the speed ratio is changed by the fuzzy logic rules on the basis of the deviation and deviation variation velocity. Therefore, the speed ratio is prevented from overshooting, wasteful variations of the revolution speed on the power source side are eliminated, and wasting of energy can be prevented.

When the deviation and the acceleration pedal position variation velocity are small, changing the speed ratio is inhibited. Therefore, excessive speed ratio variations and frequent variations of the revolution speed on the power source side can be prevented, and wasting of energy of the power source can be prevented.

According to the second structure of the present invention, the engine output torque can be controlled so as to compensate for changes of the acceleration during acceleration or deceleration on the basis of the processing for predicting changes of at least one of the vehicle acceleration and the axial torque of the drive wheel. Therefore, a smooth acceleration feeling and a rapid response to acceleration or deceleration can be realized.

Furthermore, changes of at least one of the vehicle acceleration and the axial torque of the drive wheel can be predicted from the speed ratio, primary pulley revolution speed (revolution speed on the transmission input side), engine revolution speed, throttle opening, or vehicle derivative of acceleration information. Therefore, a smooth acceleration feeling and a rapid acceleration response can be realized.

At least one of the prediction and the torque control is performed by fuzzy logic rules. Therefore, a smooth acceleration feeling and a rapid acceleration response can be realized.

According to the third structure of the present invention, the processing that the speed ratio characteristics of a finite speed automatic transmission are set or selected in a continuously variable transmission is provided. Therefore, the user can enjoy finite speed ratio characteristics and can find pleasure in more speed ratio characteristics because the easiness of maneuverability is improved.

Furthermore, by the processing that speed ratio characteristics are set or selected continuously, finite speed ratio characteristics can be slowly changed to continuously variable speed ratio characteristics. Therefore, the easiness of maneuverability is improved and the user can find pleasure in more speed ratio characteristics.

According to the fourth structure of the present invention, the processing that the speed ratio velocity can be corrected by using the predicting time necessary for reaching the target speed ratio on the basis of the user's input instruction is provided. Therefore, the speed ratio variation velocity characteristics can be changed continuously and the acceleration feeling which is to the user's taste can be easily set.

According to the fifth structure of the present invention, the best vehicle acceleration response corresponding to the vehicle velocity and throttle opening is calculated as a target acceleration response, and the self adjustment of the speed ratio control parameter is performed so as to bring the acceleration response close to the target acceleration response on the basis of the comparison result information between the measured acceleration response and the target acceleration response calculated as mentioned above. Therefore, the acceleration response close to the target acceleration response can be obtained always under the condition that the vehicle response characteristics are changed.

According to the sixth structure of the present invention, the comparison of the acceleration response is performed by using the index values of the acceleration response time and of the down-shock magnitude. Therefore, an acceleration response with a short response time and a small down-shock magnitude is available.

According to the seventh structure of the present invention, at least one of calculation of the target acceleration response and changing of the speed ratio control parameter is performed using fuzzy logic rules. Therefore, the target acceleration response which finely corresponds to the vehicle velocity and throttle opening or the speed ratio control parameter variation can be calculated.

The foregoing and other objects, advantages, manner of operation and novel features of the present invention will be understood from the following detailed description when read in connection with the accompanying drawings.

BRIEF DESCRIPTION OF THE DRAWINGS

FIG. 28 is a block diagram of the fourth embodiment of the present invention.

DETAILED DESCRIPTION OF THE PREFERRED EMBODIMENTS

Next, the first embodiment of the present invention will be described with reference to FIGS. 1 to 10.

Figure 1:
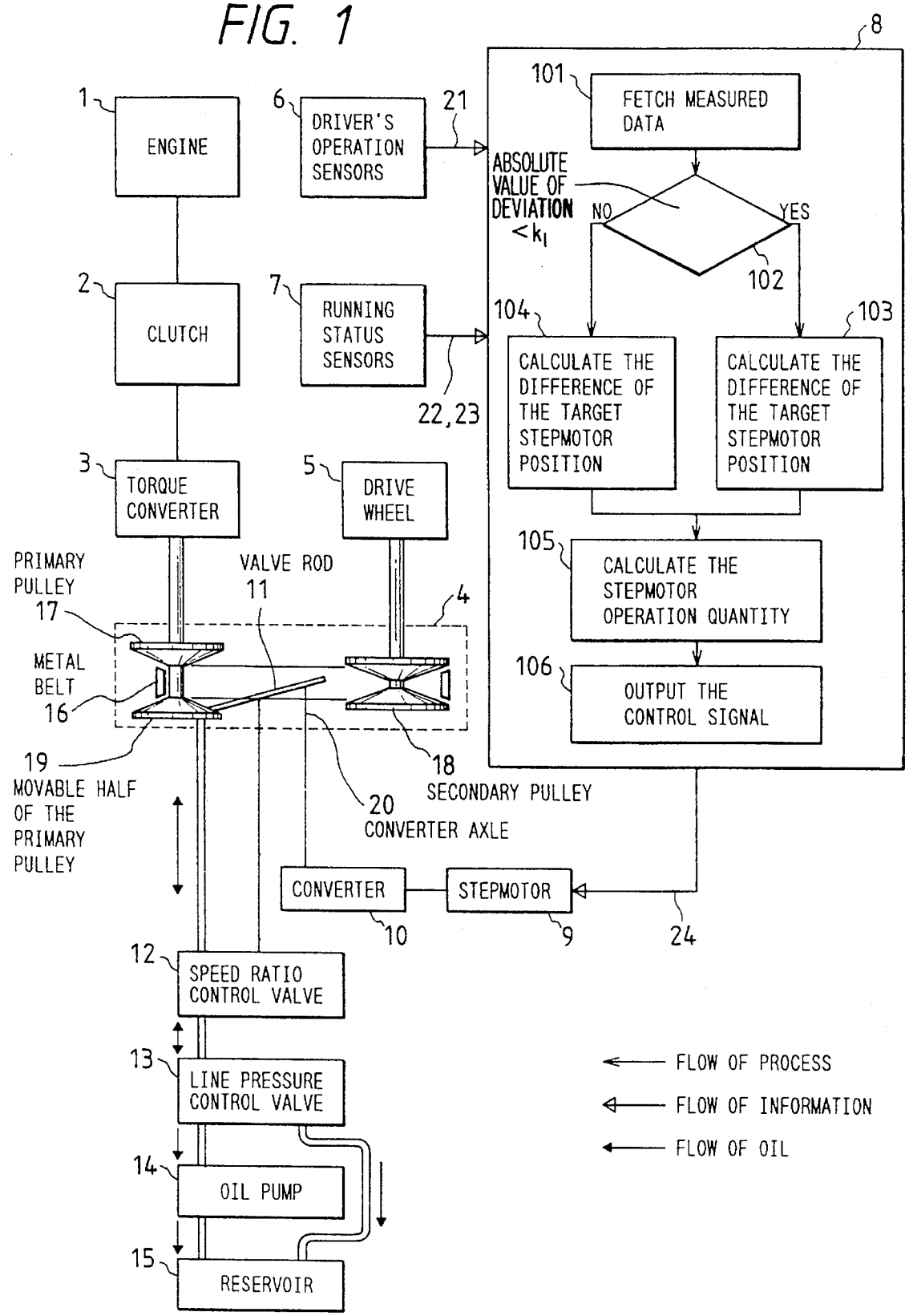
FIG. 1 is a block diagram of an embodiment of the present invention.
Figure 2:
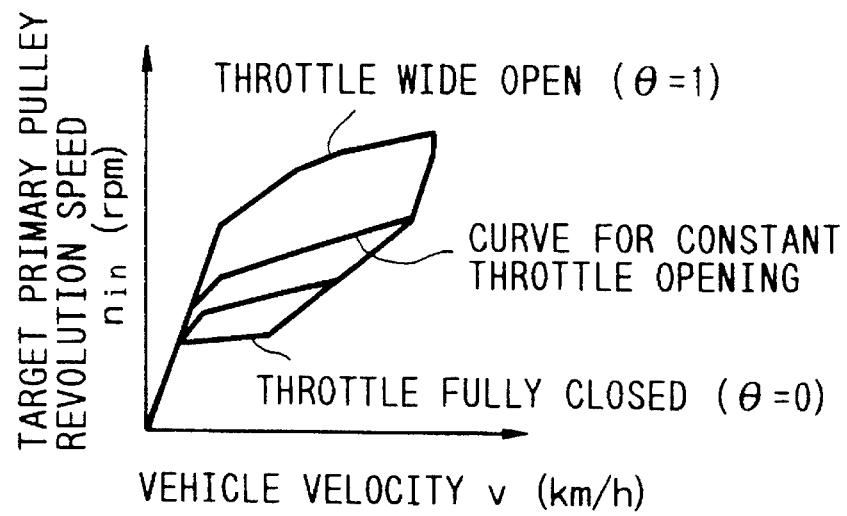
FIG. 2 shows a target primary pulley revolution speed curve diagram.

FIG. 1 shows the structure of this embodiment. In a vehicle which is driven by transmitting the drive force of an engine 1, which is a power source, to a drive wheel 5 via a clutch 2, a torque converter 3, and a hydraulic drive belt type continuously variable transmission 4, a microcomputer 8 obtains and outputs a control instruction value 24 to a step motor 9 on the basis of throttle opening information 21 measured by driver's operation sensors 6, vehicle velocity information 22 measured by vehicle running status sensors 7, and revolution speed information 23 of a primary pulley 17 of the continuously variable transmission 4. The speed ratio mechanism by the step motor 9 is the same type as that indicated in Japanese Patent Application Laid-Open No. 198447553 and well known. The step motor 9 decreases the speed ratio (output side belt running diameter/input side belt running diameter or revolution speed of the primary pulley 17/revolution speed of the secondary pulley 18) by moving a speed ratio control valve 12 via a converter 10 and a valve rod 11 and inserting high pressure oil into a movable half of the primary pulley 19 of the continuously variable transmission 4 or increases the speed ratio by returning the oil from the movable half of the primary pulley 19 to a reservoir 15. One end of the valve rod 11 is in contact with the inner conical surface of the movable half of the primary pulley 19 and the other end of the valve rod 11 is in contact with a shaft 20 of the converter 10. The drive torque of the continuously variable transmission 4 is transmitted sequentially to the primary pulley 17, a metal belt 16, and the secondary pulley 18. Next, the processing contents of the microcomputer 8 which is an essential section of this patent will be described.

A rough flow chart of the processing procedure of the microcomputer 8 is shown in FIG. 1. The microcomputer 8 reads the throttle opening information 21, the vehicle velocity information 22, and the primary pulley revolution speed information 23 by a measured data read block 101, calculates the target primary pulley revolution speed from the throttle opening information 21 and the vehicle velocity information 22, and goes to a block 102. So as to calculate the above target primary pulley revolution speed, the microcomputer 8 stores data of the relational curves between the target primary pulley revolution speed, vehicle velocity, and throttle opening shown in FIG. 2 beforehand, and determines the target primary pulley revolution speed at an optional vehicle velocity and throttle opening by linear interpolation using those data. In the deviation judgment block 102, the microcomputer 8 determines the difference e $(n_{in} - nN°_{in})$ between the target primary pulley revolution speed $n_{in}$ determined by the block 101 and the primary pulley revolution speed $n_{in}$. The difference is called the deviation. When the absolute value e of the deviation becomes as follows:

$$|e| < h_i \text{ (constant)}$$

the microcomputer 8 goes to a block 103. When the absolute value is equal to or more than $h_1$, the microcomputer 8 goes to a block 104. There are four fuzzy logic rules available, as shown below, in the target step motor position difference calculation block 103.

(Fuzzy logic rule 1)
When the following are satisfied:
e is negative and small, and
Δe (e at present "−"e 10 ms before is negative and small,
the microcomputer 8 allows the step motor to run moderately in the direction where the speed ratio increases.
(Fuzzy logic rule 2)
When the following are satisfied:
{e is positive and small and Δe is positive and small,
the microcomputer 8 allows the step motor to run moderately in the direction where the speed ratio decreases.
(Fuzzy logic rule 3)
When the following are satisfied:
{e is zero and Δe is zero,
the step motor is fixed (1).
(Fuzzy rule 4)

$$\begin{cases} \text{When the following are satisfied:} \\ |e| \text{ is small, and} \\ |\Delta\theta| \text{ (throttle opening at present } - \\ \text{throttle opening 100 ms before)| is small,} \end{cases}$$

the step motor is fixed (2).
The microcomputer 8 determines the target step motor position difference ΔI on the basis of the above four rules, and goes to a block 105. The target step motor position difference ΔI is calculated from the following expression:

$$\Delta I = \left( \frac{\sum_i y_i G_i S_i}{\sum_i y_i S_i} \right) \cdot k_2, i = 1, 2, 3$$

Symbols $G_i$ and $S_i$ in the above expression indicate a gravity center and an area of membership functions N1, P1, and Z1 of the fuzzy logic rules 1 to 3 such as:
the microcomputer 8 allows the step motor to run moderately in the direction where the speed raio increases,
the microcomputer 8 allows the step motor to run moderately in the direction where the speed raio decreases, and
the step motor is fixed (1).
A symbol $y_i$ (i= 1, 2, and 3) indicates the adaptation of each of the rules 1 to 3. When the adaptation at e and Δe of the membership functions SNE, SNDE, SPE, SPDE, ZRE, and ZRDE of the fuzzy rules 1 to 3 shown below:
e is negative and small,
Δe is negative and small,
e is positive and small,
Δe is positive and small,
e is zero, and
Δe is zero,
is expressed by $x_1$, $x_2$, $x_3$, $x_4$, $x_5$, and $x_6$, the adaptation yi is determined by the following expressions:

$$y_1 = \min. (x_1, x_2),$$

$$y_2 = \min. (x_3, x_4), \text{ and}$$

$$y_3 = \min. (x_5, x_6).$$

Figure 3:
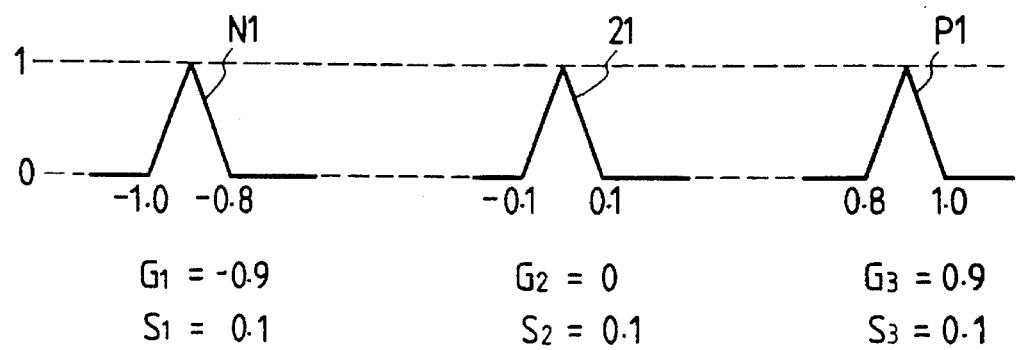
FIGS. 3 to 7 show membership functions of this embodiment.
Figure 4:
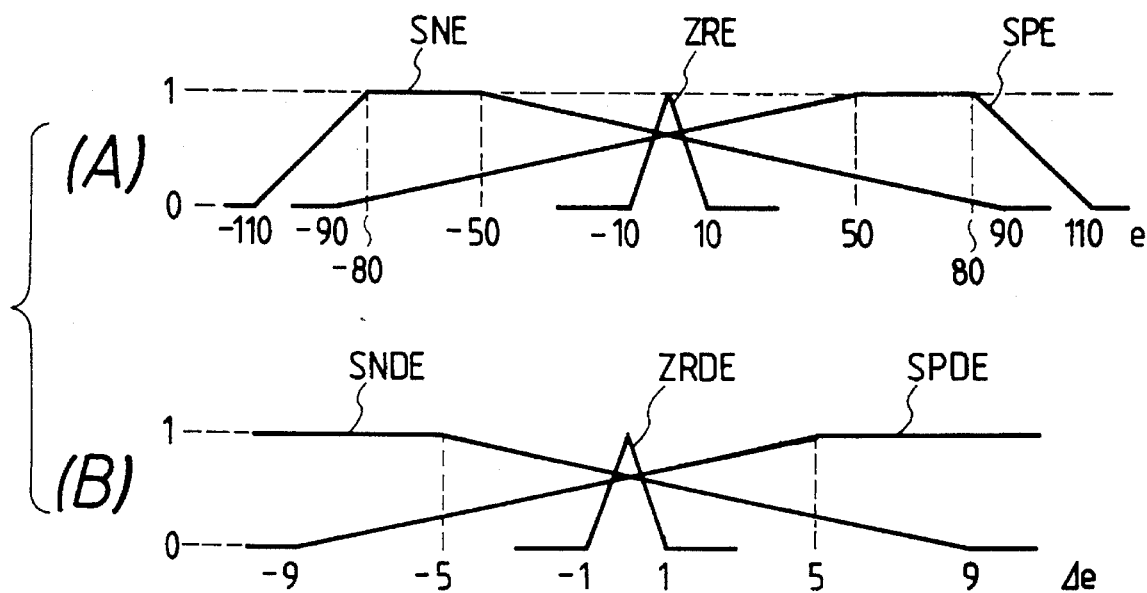
Figure 5:
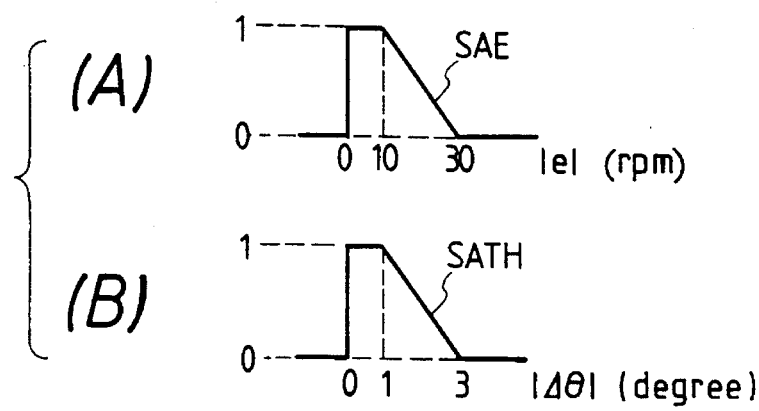

The adaptation for each membership function means a vertical coordinate value corresponding to a transverse coordinate value when the membership function is considered as a mapping function wherein a vertical coordinate value (adaptation 0 to 1) corresponds to a variable of the transverse coordinate. FIG. 3 shows the membership functions N1, Z1, and P1, and the transverse coordinate indicates the step count variation of the step motor. FIG. 4 (A) shows the membership functions SNE, ZRE, and SPE, and the transverse coordinate indicates the deviation e [rpm]. FIG. 4 (B) shows the membership functions SNDE, ZRDE, and SPDE, and the transverse coordinate indicates the deviation difference Δe [rpm]. A coefficient of $k_2$ in the expression for determining the target step motor position difference ΔI is determined from the following expression:

$$k_2 = 1 - \min. (x_7, x_8)$$

when the adaptation at e and Δθ of the membership functions SAE and SATH of the fuzzy rule 4 shown below:
|e| is small, and
|Δθ| is small,
is expressed by $x_7$ and $x_8$. FIG. 5 (A) shows the membership function SAE, and the transverse coordinate indicates |e| [rpm]. FIG. 5 (B) shows the membership function SATH, and the transverse coordinate indicates |Δθ| [degree]. There are four fuzzy rules available, as shown below, in the target step motor position difference calculation block 104.
(Fuzzy logic rule 5)
When the following are satisfied:

$$\begin{cases} e \text{ is negative and large, and} \\ T \text{ ("stationary step motor position } L_o \text{ at the} \\ \text{current speed ratio"} - \text{"current step motor position} \\ L_a\text{"}) \cdot \Delta e/e \cdot \text{sign}) \text{ is large,} \\ \text{however} \\ \text{sign} = -1 \text{ for } L_o - L_a < 0, \text{ and } \frac{\Delta e}{e} > 0 \\ \quad = -1 \text{ for } e > 0 \text{ and } \Delta e < 0, \\ \quad = -1 \text{ for } e > 0 \text{ and } \Delta e < 0, \\ \quad = 1 \text{ for others} \\ L_o = 0 \text{ for low gear} \\ L_o > 0 \text{ for high gear, or} \end{cases}$$

{e is negative and large and T is small, or
e is positive and large and T is medium,
the microcomputer 8 allows the step motor to run largely in the direction where the speed raio increases.
(Fuzzy logic rule 6)
When the following are satisfied:
{e is positive and large and T is large, or
{e is positive and large and T is small, or
{e is negative and large and T is medium,
the microcomputer 8 allows the step motor to run largely in the direction where the speed raio decreases.
(Fuzzy logic rule 7)

$$\begin{cases} \text{When the following are satisfied:} \\ e \text{ is positive and large, and} \\ \Delta^2 v \text{ ("current vehicle velocity"} + \text{"vehicle} \\ \text{velocity 20 ms before"} \text{ "vehicle velocity 10 ms before"} \times \\ 2) \text{ is positive and small, or} \end{cases}$$

{e is negative and large and $\Delta^2 v$ is negative and small, the microcomputer 8 decreases the running of the step motor for changing the speed ratio.

(Fuzzy logic rule 8)

$$\begin{cases} \text{When the following are satisfied:} \\ e \text{ is negative and large, and} \\ \Delta^2 v \text{ is positive and large, positive and small, or} \end{cases}$$

$$\begin{cases} \text{negative and large, or} \\ e \text{ is positive and large, and} \\ \Delta^2 v \text{ is positive and large, negative and small, or} \end{cases}$$

negative and large,
the microcomputer 8 does not correct the running of the step motor for changing the speed ratio.

The microcomputer 8 determines the target step motor position difference ΔI on the basis of the above four rules, and goes to the block 105. The target step motor position difference ΔI is calculated from the following expression:

$$\Delta I = \frac{\sum_j y_j \cdot G_j \cdot S_j}{\sum_j y_j \cdot S_j} \cdot \frac{\sum_k y_k \cdot G_k \cdot S_k}{\sum_k y_k \cdot S_k}, \quad \begin{array}{l} j=5,6 \\ k=7,8 \end{array}$$

Symbols $G_j$, $S_j$, $G_k$, and $S_k$ in the above expression indicate a gravity center and an area of membership functions N2, P2, M1, and M2 of the fuzzy rules 5 to 8 such as:

the microcomputer 8 allows the step motor to run largely in the direction where the speed ratio increases, the microcomputer 8 allows the step motor to run largely in the direction where the speed ratio decreases, the microcomputer 8 decreases the running of the step motor for changing the speed ratio, and the microcomputer 8 does not correct the running of the step motor for changing the speed ratio.

Figure 6:
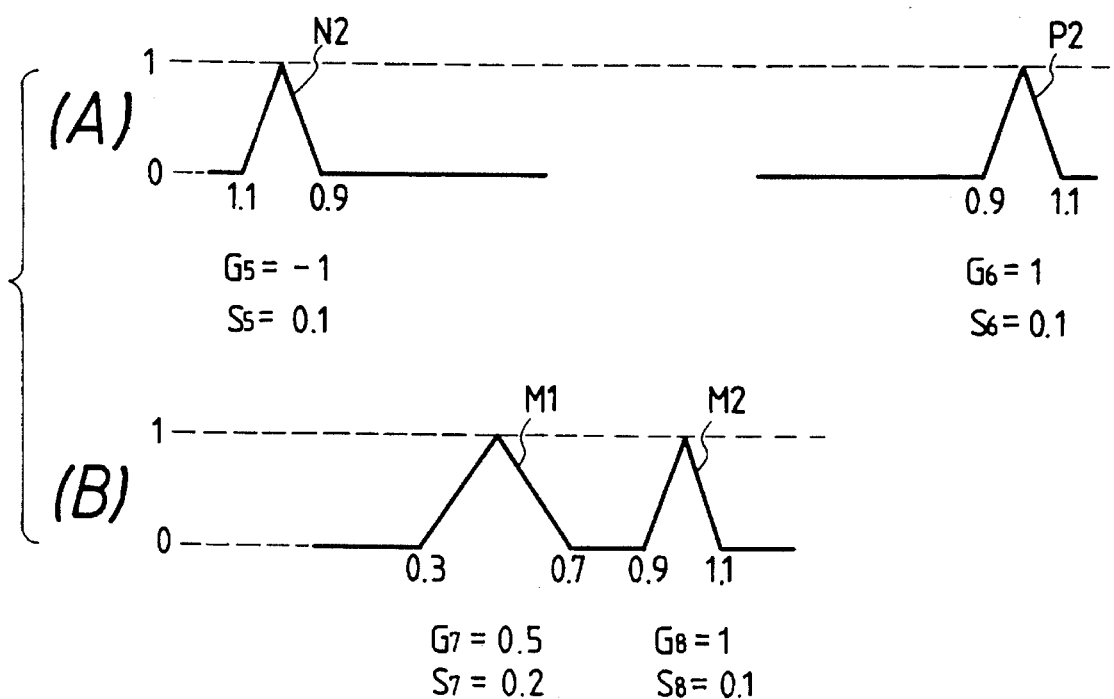
Figure 7:
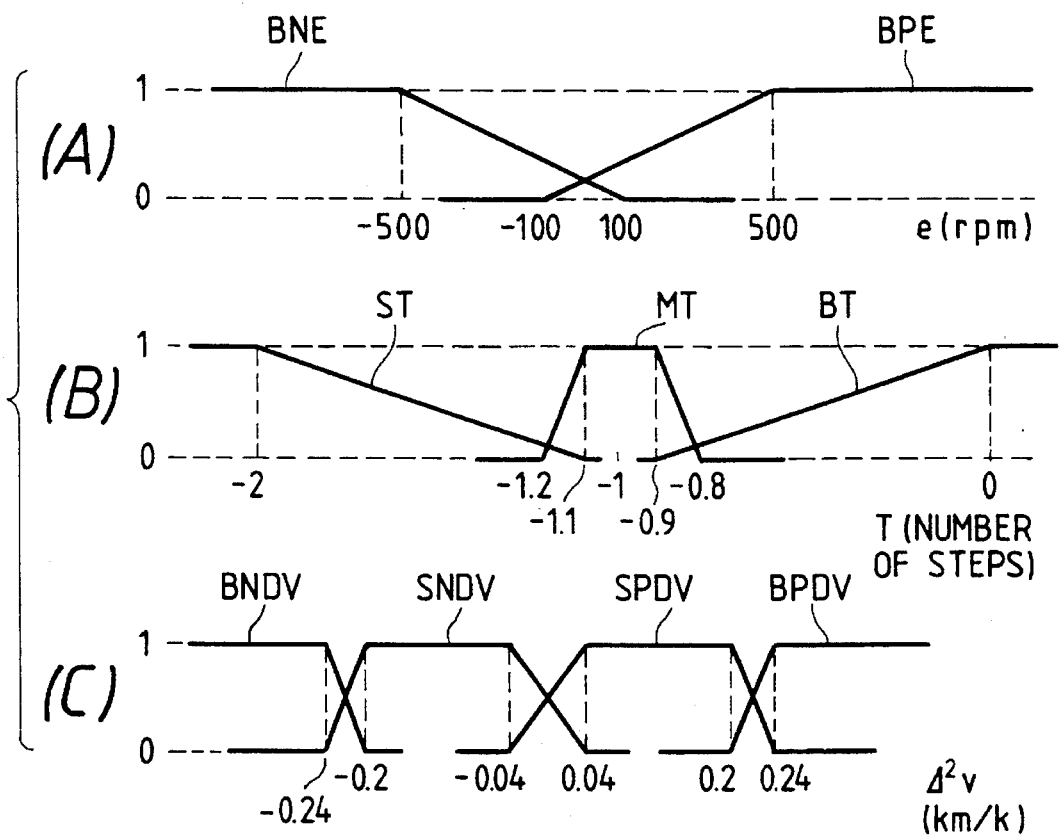

Symbols $y_j$ (j= 5 and 6) and $y_k$ (k= 7 and 8) indicate the adaptation of each of the rules 5 to 8. When the adaptation at e, T, and $\Delta^2 v$ of the membership functions BNE, BPE, BT, MT, ST, BNDV, SNDV, SPDV, and BPDV of the fuzzy logic rules 5 to 8 shown below:

T is large,
T is medium,
T is small,
$\Delta^2 v$ is negative and large,
$\Delta^2 v$ is negative and small,
$\Delta^2 v$ is positive and small, and
$\Delta^2 v$ is positive and large, is expressed by $x_7$, $x_8$, $x_9$, $x_{10}$, $x_{11}$, $x_{12}$, $x_{13}$, $x_{14}$, and $x_{15}$, the adaptation $y_j$ or $y_k$ is determined by the following expressions:

$y_5 = \max\{\min[x_7, \max(x_9, x_{11})], \max(x_8, x_{10})\}$, $y_6 = \max\{\min(x_7, x_{10}), \min[x_8, \max(x_9, x_{11})]\}$, $y_7 = \max\{\min(x_7, x_{14}), \min(x_8, x_{13})\}$, $y_8 = \max\{\min[x_7, \max(x_{12}, x_{14}, x_{15})], \min[x_8, \max(x_{12}, x_{13}, x_{15})]\}$ FIG. 6 (A) shows the membership functions N2 and P2, and the transverse coordinate indicates the step count variation of the step motor. FIG. 6 (B) shows the membership functions M1 and M2, and the transverse coordinate indicates a nondimensional coefficient. FIG. 7 (A) shows the membership functions BNE and BPE, and the transverse coordinate indicates the deviation e [rpm]. FIG. 7 (B) shows the membership functions ST, MT, and BT, and the transverse coordinate indicates T (the number of steps). FIG. 7 (C) shows the membership functions BNDV, SNDV, SPDV, and BPDV, and the transverse coordinate indicates $\Delta^2 v$ [km/h]. Symbols $L_o$ and $L_a$ which are used for calculation of T are determined as shown below. $L_a$ is determined by the step motor operation quantity calculation block 105 10 ms before. As to $L_o$, the speed ratio i is calculated from the following expression first:

$$i \text{ (current speed ratio)} = \frac{n_{in} \cdot 3.6 \cdot 2\pi \text{ Running radius of drive wheel } [m]}{v \cdot 60 \cdot \text{final gear ratio}}$$

Figure 8:
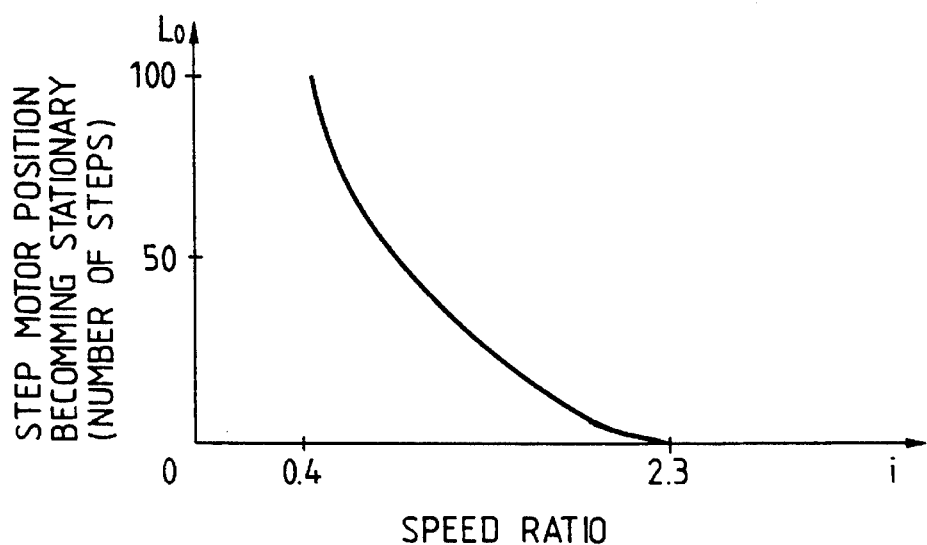
FIG. 8 shows a relation curve between the speed ratio and the stationary step motor position.

(v[km / h]: vehicle velocity)
and $L_o$ is determined by linear interpolation using the relational curve date between the speed ratio i and "i–$L_o$" which is stored in the microcomputer 8 beforehand. FIG. 8 shows a relational curve between i (speed ratio) and $L_o$ (balanced step motor position in the stationary state).

Figure 9:
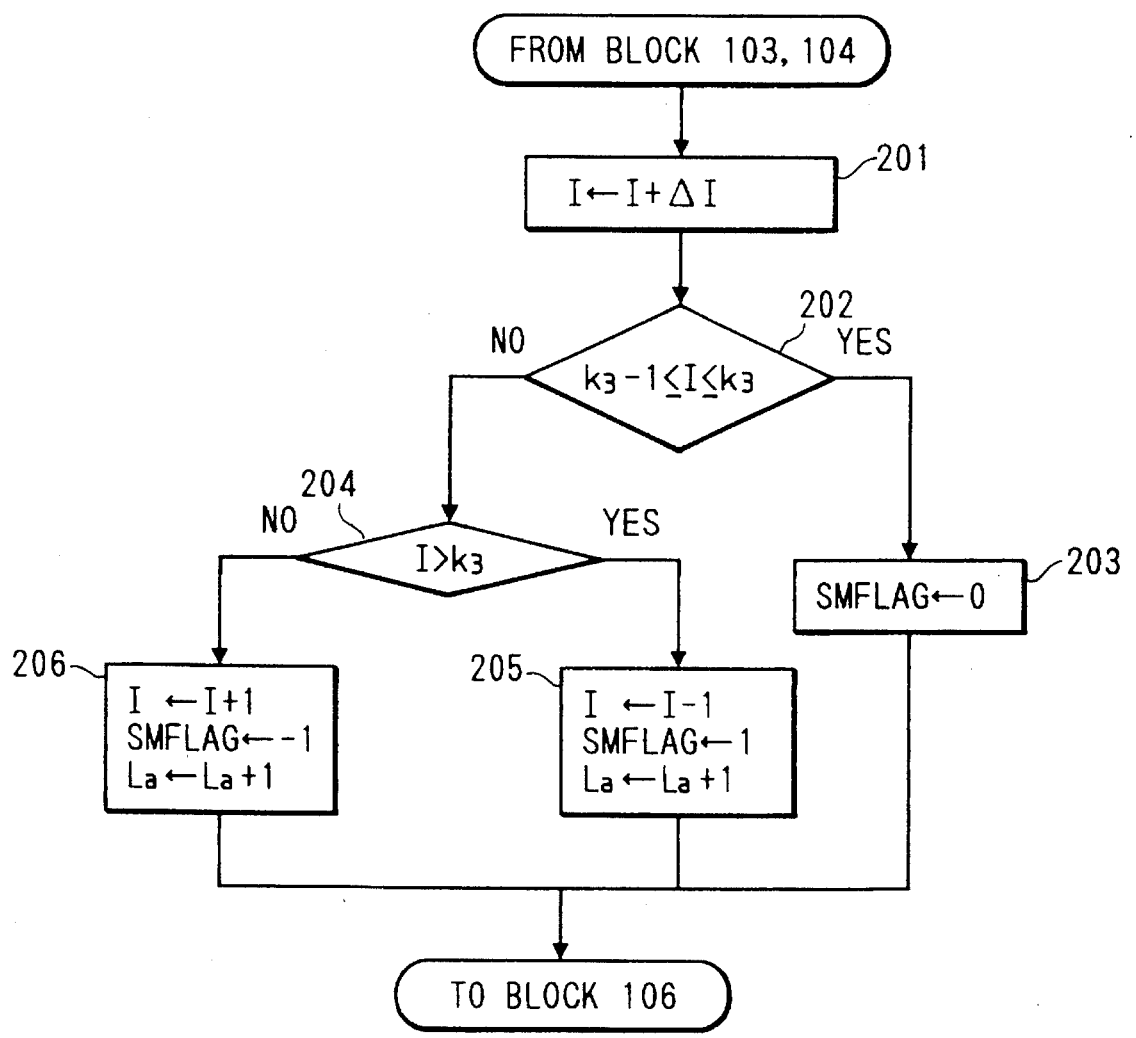
FIG. 9 is a detailed flow chart of the processing procedure of a processing block 105.

FIG. 9 shows a detailed flow chart of the processing procedure of the step motor operation quantity calculation block 105. The microcomputer 8 calculates:

I←I+ΔI in a block 201 and goes to a block 202. The microcomputer 8 makes a branching judgment that when $k_3-1 \leq I \leq k_3$ ($k_3$: a constant between 0 and 1) in the block 202, it goes to a block 203 or in other cases, it goes to a block 204. In the block 23, the microcomputer 8 inputs

Figure 10:
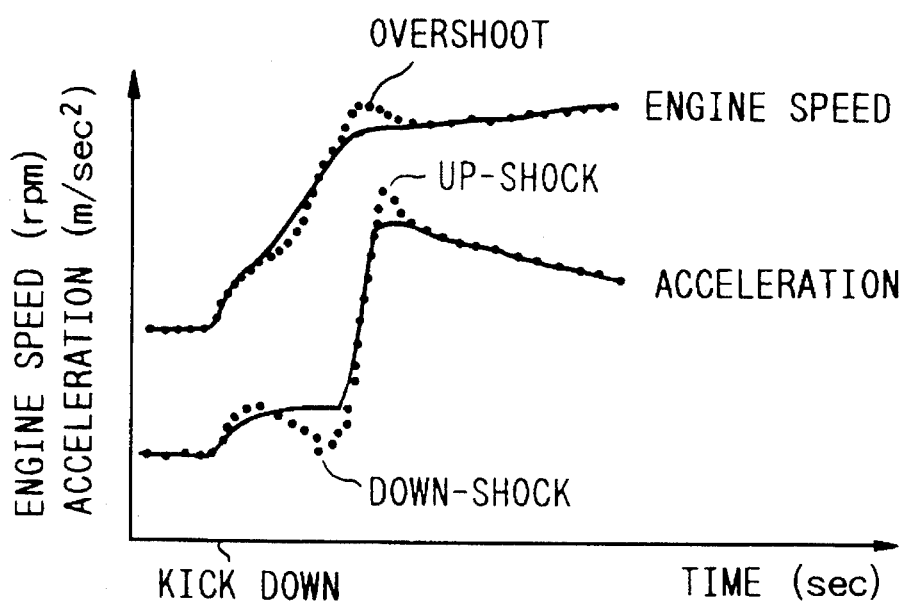
FIG. 10 is a performance comparison diagram between the control method of the present invention and the conventional control method.

"SMFLAG←0"

at the address of the operation instruction flag (SMFLAG) of the step motor and goes to a block 106. In the block 204, microcomputer 8 makes a condition branching judgment; that is, when I> $k_3$, it goes to a block 205 or in other cases, it goes to the block 206. In the block 205, the microcomputer 8 performs the following processing:

I←I-1,

SMFLAG←1, and $L_a$←$L_a$+1, and goes to the block 106. In the block 206, the microcomputer 8 performs the following processing:

I←I+1,

SMFLAG←−1, and $L_a$←$L_a$+1, and goes to the block 106. In the operation quantity output block 106, the microcomputer 8 goes and checks the value of the operation quantity instruction flag (SMFLAG). When the value is 0, the microcomputer 8 issues the instruction 24 for keeping the step motor off. When the value is 1, the microcomputer 8 issues the instruction 24 for rotating the step motor by one step so as to decrease the speed ratio. When the value is −1, the microcomputer 8 issues the instruction 24 for rotating the step motor by one step so as to increase the speed ratio. A series of processing from the block 101 to the block 106 is performed once every 10 ms. For comparison between the control method of the present patent and the conventional proportion and integration control method (the operation quantity is calculated by proportion and integration of the deviation e in the blocks 102 to 104 of this method), the vehicle acceleration and engine revolution speed responses when kicked down during stationary running of 40 km/h are shown in FIG. 10. FIG. 10 shows that by using the control method of the present patent, the acceleration is changed smoothly (free of down-shock and up-shock), the engine revolution speed is not overshot, the drivability is improved, and the fuel expense is lowered.

Next, the second embodiment of the present invention will be described with reference to FIGS. 11 to 22.

Figure 11:
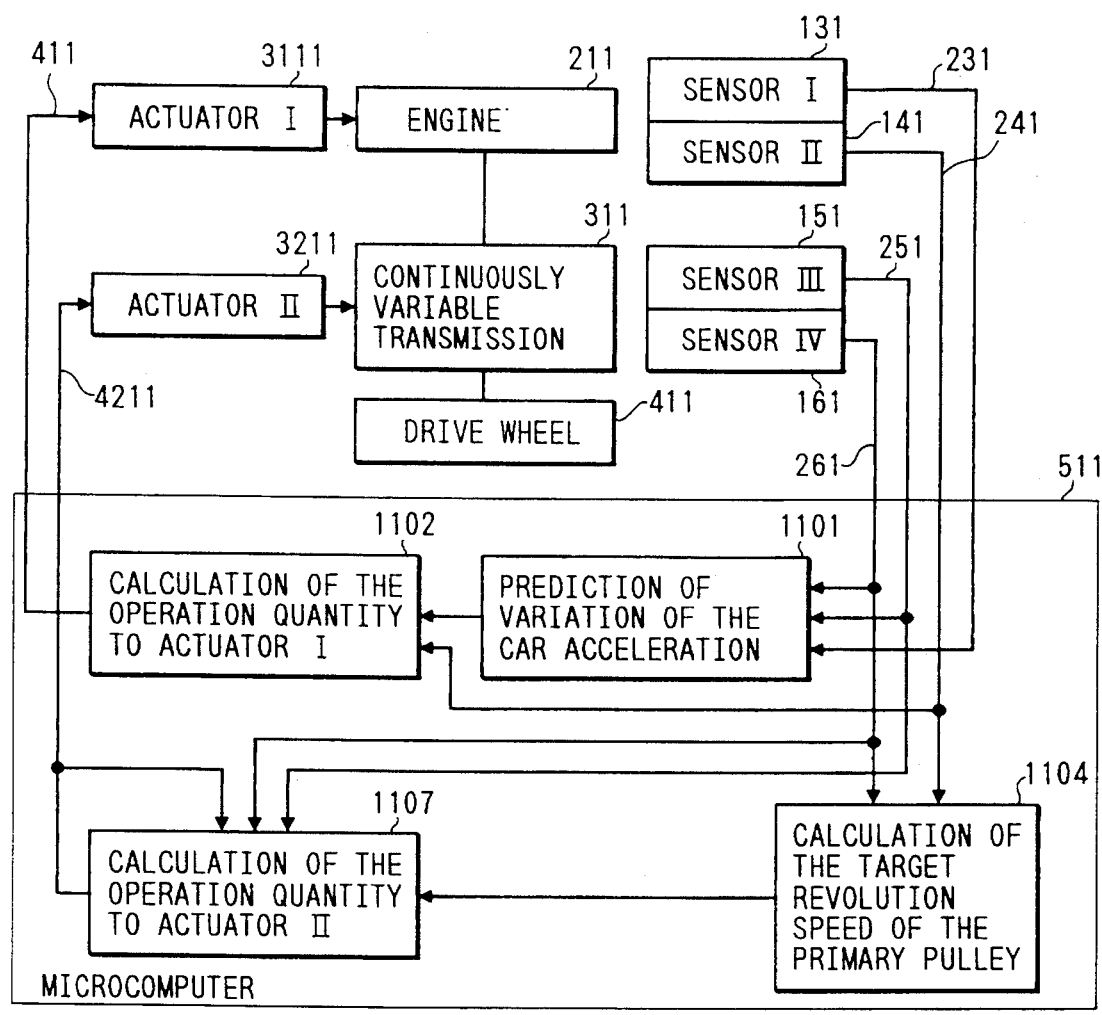
FIG. 11 is a block diagram of the second embodiment of the present invention.
Figure 12:
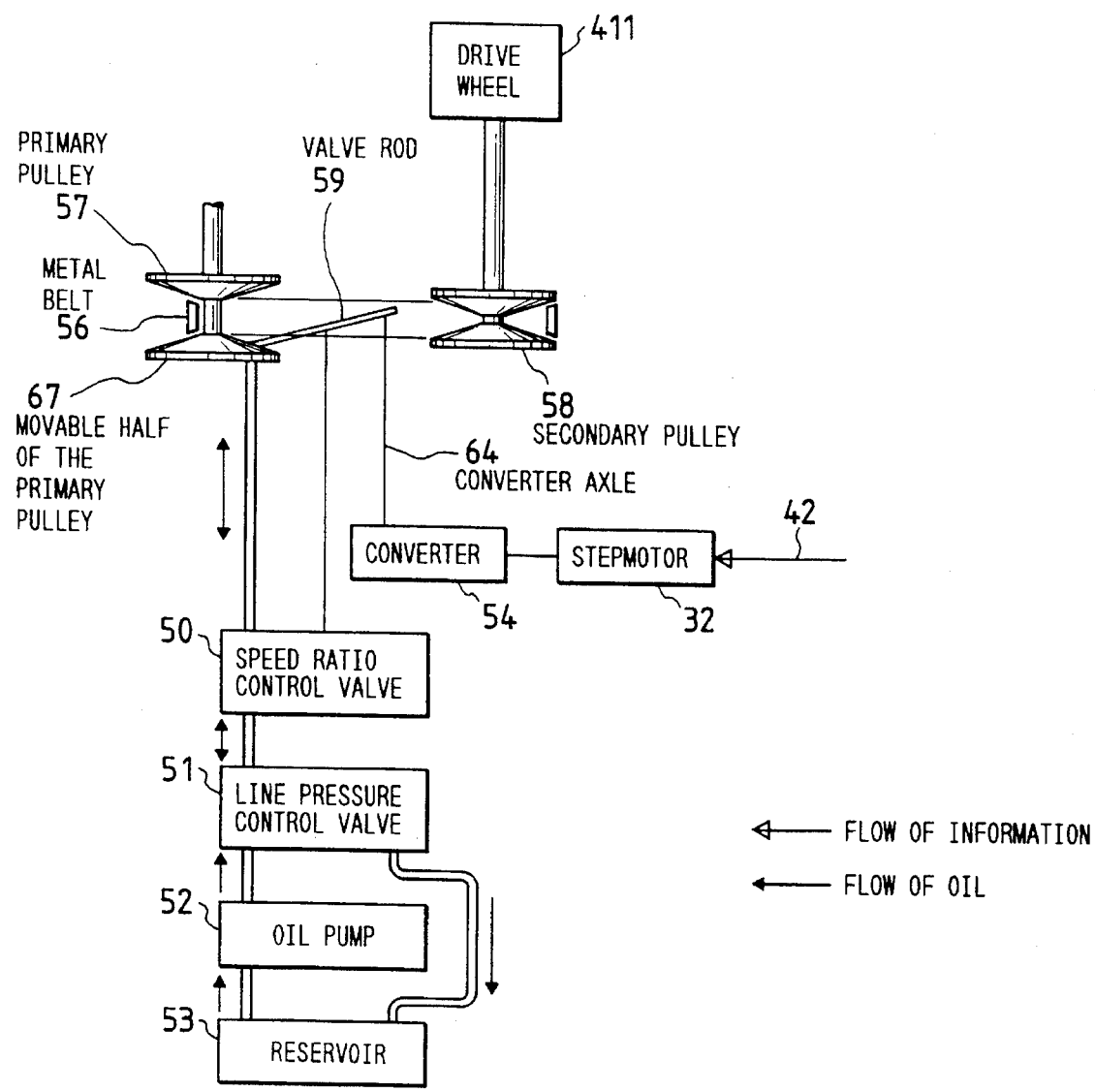
FIG. 12 is a block diagram of a continuously variable transmission.

FIG. 11 shows the structure of this embodiment. In a vehicle which is driven by transmitting the drive force of an engine 211, which is a power source, to a drive wheel 411 via a continuously variable transmission 311, a microcomputer 511 calculates an operation instruction 4111 to an actuator I (electromagnetic clutch) 3111 and an operation instruction 4211 to an actuator II (step motor) 3211 on the basis of four types of information such as engine revolution speed information 231, throttle opening information 241, primary pulley revolution speed information 251, and secondary pulley revolution speed information which are outputs from running status sensors (a sensor I131 (engine revolution speed sensor), a sensor II141 (throttle opening sensor), a sensor III151 (primary pulley revolution speed sensor), and a sensor IV161 (secondary pulley revolution speed sensor) and outputs the instructions to the actuators. The actuator I3111 adjusts the charging efficiency (intake air weight / air weight under the standard condition) to the engine cylinders by turning between a super charger of the engine 211 and a shaft, which rotates via a belt from the engine crank shaft, ON or OFF on the basis of the operation instruction 4111 and controls the engine output. The actuator II3211 controls the speed ratio of the continuously variable transmission 311 on the basis of the operation instruction 4211. The engine 211 is an ordinary engine having a super charger and an electronic fuel injection system, and the transmission 311 has the structure shown in FIG. 12. The speed ratio mechanism by the actuator II3211 on the basis of the operation instruction 4211 is the same type as that indicated in Japanese Patent Application Laid-Open No. 1984-47553 and well known. The actuator II3211 decreases the speed ratio (output side belt running diameter/input side belt running diameter or revolution speed of a primary pulley 57/revolution speed of a secondary pulley 58) by pouring high pressure oil into the primary pulley 57 of the continuously variable transmission 311 by operating a speed ratio control valve 50 via a converter 54 and a valve rod 59 or increases the speed ratio by returning the oil from the primary pulley 57 to a reservoir 53. One end of the valve rod 59 is in contact with the inner conical surface of the movable half of the primary pulley 57 and the other end of the valve rod 59 is in contact with a shaft 64 of the converter 54. The drive torque of the continuously variable transmission 311 is transmitted sequentially to the primary pulley 57, a metal belt 56, and the secondary pulley 18. Next, the processing contents of the microcomputer 511 which is an essential section of this patent will be described.

The processing of the microcomputer 511 is outlined in FIG. 11. The microcomputer 511 calculates the acceleration variation predicted value in a vehicle acceleration variation prediction processor 1101 using engine revolution speed information 231, primary pulley revolution speed information 251, and secondary pulley revolution speed information 261, calculates the operation instruction value in an operation quantity calculation processor 1102 to the actuator I on the basis of this predicted value, outputs the operation instruction 4111, calculates the target primary pulley revolution speed in a target primary pulley revolution speed calculation processor 1104 using the throttle opening information 241 and the secondary pulley revolution speed information 261, calculates the operation instruction value in an operation instruction calculation processor 1107 to the actuator II on the basis of this target primary pulley revolution speed, the primary pulley revolution speed information 251, the secondary pulley revolution speed information 261, and the past operation instruction 4211, and outputs an operation instruction 4211. The above series of processing of the microcomputer 511 is performed every 0.01 seconds.

Figure 13:
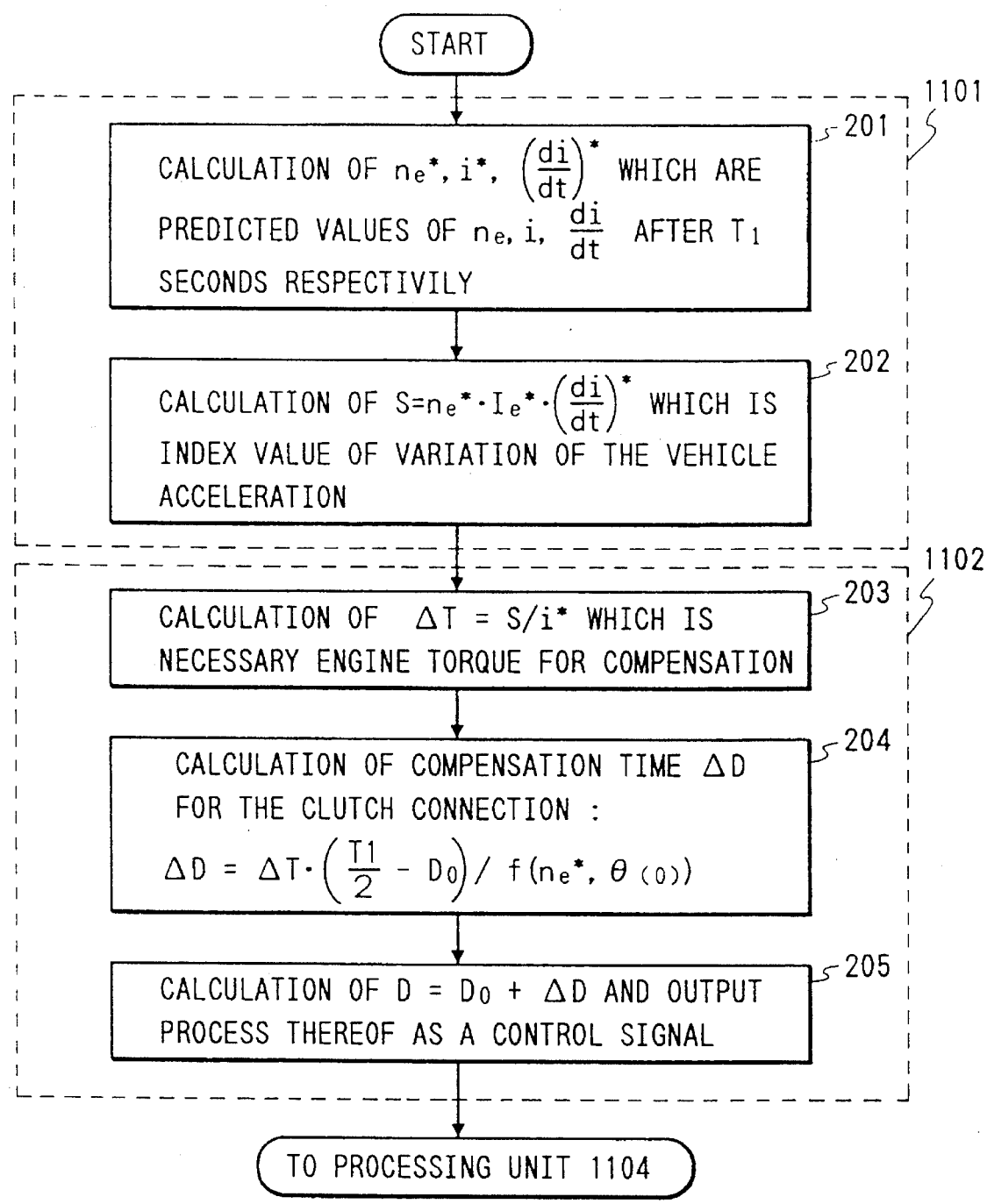
FIGS. 13 and 16 are microcomputer processing flow charts.
Figure 14:
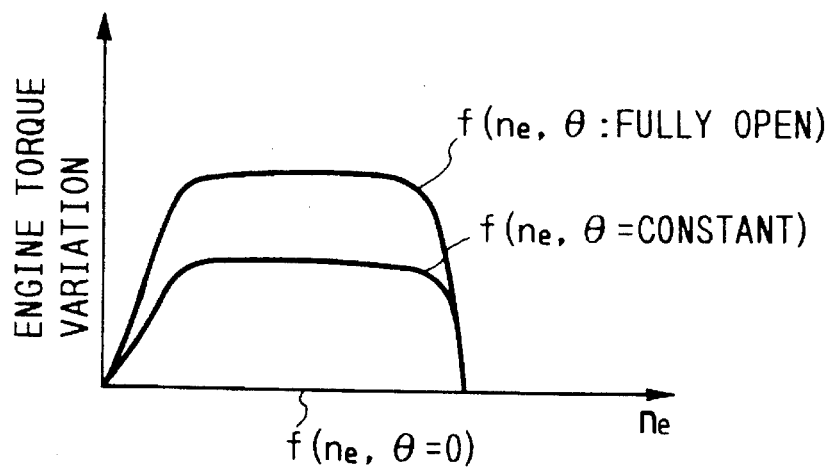
FIG. 14 is an engine with a super judger torque variation characteristic diagram.

FIG. 13 shows a detailed processing flow chart of the vehicle acceleration variation prediction processor 1101 and the operation instruction calculation processor 1102 to the actuator I. In the processor 201, using the measured values at this time:

$n_e(0)$: engine revolution speed,
$n_{in}(0)$: primary pulley revolution speed, and
$n_{out}(0)$: secondary pulley revolution speed, and the measured values $n_e(-k)$, $n_{in}(-k)$, and $n_{out}(-k)$ k×0.01 (k= 1, 2) seconds before, the microcomputer 511 determines the predicted values of engine revolution speed, speed ratio, and speed ratio velocity $T_1 = 0.02$ seconds later from the following expressions:

$$n_e^* = 2n_e(0) - n_e(-2),$$

$$i^* = \frac{2n_{in}(0)}{n_{out}(0)} - \frac{n_{in}(-2)}{n_{out}(-2)}, \text{ and}$$

$$\left(\frac{di}{dt}\right)^* = \frac{1}{0.005}\left\{\frac{2n_{in}(0)}{n_{out}(0)} - \frac{3n_{in}(-1)}{n_{out}(-1)} + \frac{n_{in}(-2)}{n_{out}(-2)}\right\}$$

and goes to the processor 202. In the processor 202, the microcomputer 511 determines a vehicle acceleration variation index value S:

$$S = n_e^* \cdot I_e \cdot \left(\frac{di}{dt}\right)^*,$$

where: Ie: Moment of inertia from the engine to the primary pulley,
and goes to the processor 203. In the processor 203, the microcomputer 511 determines necessary correction torque $\Delta Te$:

$$\Delta Te = S/i^*$$

and goes to the processor 204. In the processor 204, the microcomputer 511 determines a clutch connection correction time $\Delta D$:

$$\Delta D = \Delta Te \cdot \left(\frac{T_1}{2} - D_o\right) f(\theta(O), n_e^*),$$

where: $D_o$: Standard clutch ON,
by interpolation using the measured value $\theta(0)$ at this time (throttle opening), $\Delta Te$, and the clutch connection time and engine torque characteristic data stored in the $n_e^*$ microcomputer 511 (FIG. 14), and goes to the processor 205. In the processor 205, the microcomputer 511 determines a total clutch ON time from the following expression:

$$D = D_o + \Delta D$$

The microcomputer 511 outputs the value to the actuator I as an operation instruction 4111 and goes to the processor 1104 shown in FIG. 11.

Figure 15:
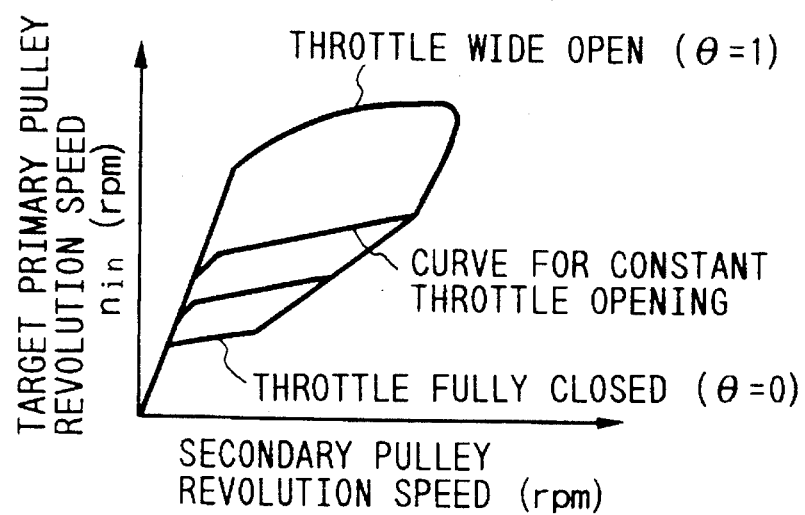
FIG. 15 is a target primary pulley revolution speed characteristic diagram.
Figure 16:
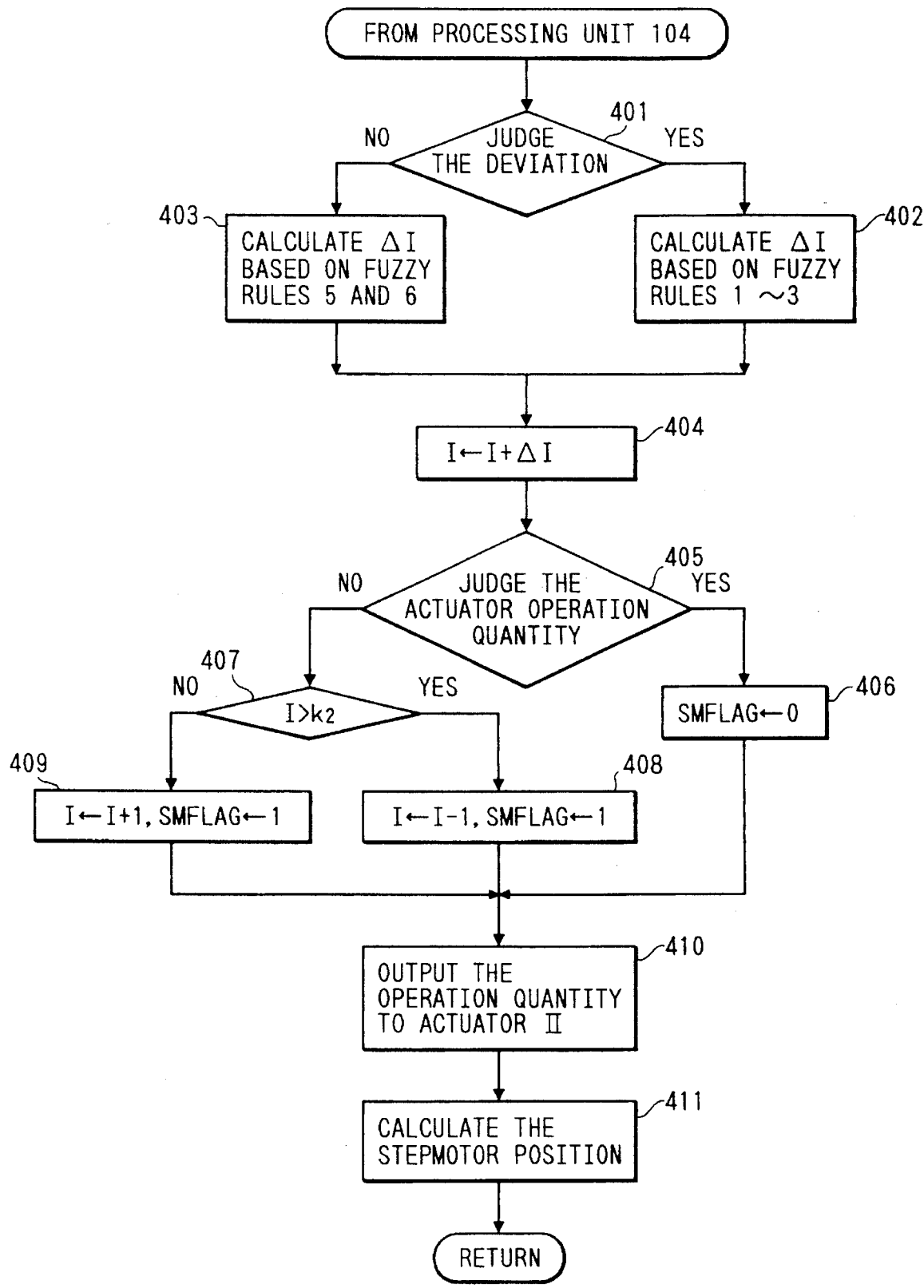
Figure 17:
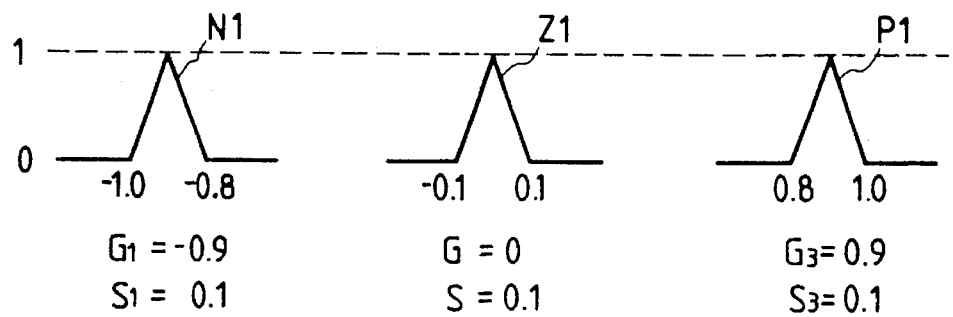
FIGS. 17 and 18 show membership functions of fuzzy logic rules 1, 2, and 3.
Figure 18:
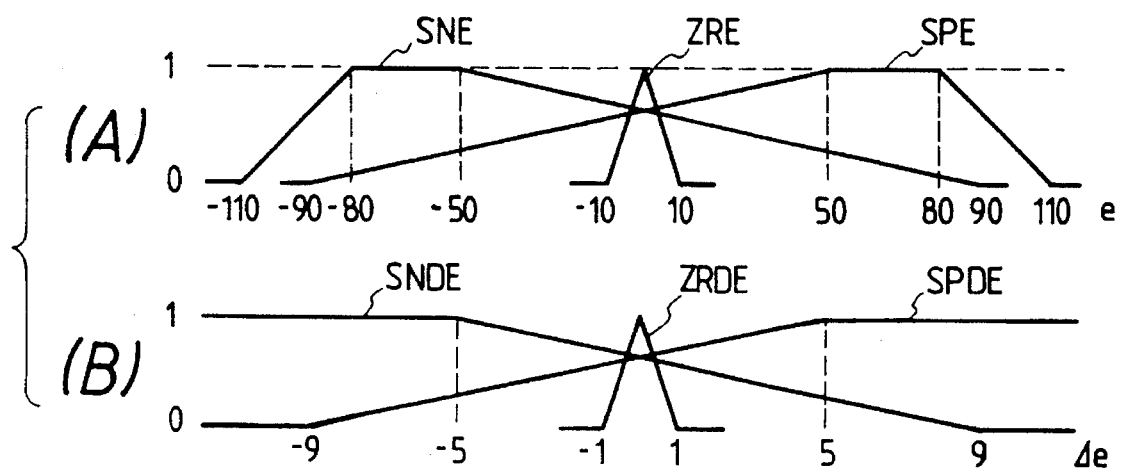

In the target primary pulley revolution speed calculation processor 1104, the microcomputer 511 calculates the target primary pulley revolution speed $n_{in}$ from the throttle opening information 24θ(0) and the secondary pulley revolution speed information 26$n_{out}$(0) using the relational curves shown in FIG. 15, and goes to the next processor 1107. FIG. 16 shows a detailed processing flow chart of the operation instruction calculation processor 1107 to the actuator II. In a deviation judgment section 401, the microcomputer 511 determines the difference e $(n°_{in}(0)-n_{n°in})$ between the target primary pulley revolution speed $n°_{in}$ and the primary pulley revolution speed $n_{in}(0)$. When the absolute value e satisfies the following expression:

$$|e|<k_1 \text{ (constant)}$$

the microcomputer 511 goes to a processor 402. In other cases, the microcomputer 511 goes to a processor 403. In the processor 402, the microcomputer 511 determines Δe "e at present"—"e obtained 0.01 seconds before". There are three fuzzy logic rules available as shown below.

(Fuzzy logic rule 1)
When the following are satisfied:

$$\begin{cases} e \text{ is positive and small, and} \\ \Delta e \text{ is positive and small,} \end{cases}$$

the microcomputer 511 allows the step motor to run a little in the direction where the speed raio increases.

(Fuzzy logic rule 2)
When the following are satisfied:

$$\begin{cases} e \text{ is negative and small, and} \\ \Delta e \text{ is negative and small,} \end{cases}$$

the microcomputer 511 allows the step motor to run a little in the direction where the speed raio decreases.

(Fuzzy logic rule 3)
When the following are satisfied:

$$\begin{cases} e \text{ is zero, and} \\ \Delta e \text{ is zero,} \end{cases}$$

the step motor is fixed.

The microcomputer 511 determines the first target value ΔI of step motor movement on the basis of the above three rules, and goes to a processor 404.

The first target value ΔI is determined from the following expression:

$$\Delta I = \left( \frac{\sum_i y_i \cdot G_i \cdot S_i}{\sum_i y_i \cdot S_i} \right) \quad i = 1, 2, 3$$

Symbols $G_i$ and $S_i$ in the above expression indicate a gravity center and an area of the membership functions (see FIG. 17) of the fuzzy logic rules 1 to 3 such as:

the microcomputer 511 allows the step motor to run a little in the direction where the speed raio increases (N1), the microcomputer 511 allows the step motor to run a little in the direction where the speed raio decreases (P1), and the step motor is fixed (Z1).

A symbol $y_i$ indicates the adaptation of each of N1, P1, and Z1. When the adaptation at e and Δe of the membership functions of the fuzzy logic rules 1 to 3 shown below:

e is positive and small (SPE),
Δe is positive and small (SPDE),
e is negative and small (SNE),
Δe is negative and small (SNDE),
e is zero (ZRE), and
Δe is zero (ZRDE), is expressed by $x_1$, $x_2$, $x_3$, $x_4$, $x_5$, and $x_6$, the adaptation $y_i$ is determined by the following expressions (see FIG. 18):

$$y_1 = \min. (x_3, x_4),$$

$$y_2 = \min. (x_5, x_6), \text{ and}$$

$$y_3 = \min. (x_1, x_2).$$

The adaptation for each membership function means a vertical coordinate value corresponding to a transverse coordinate value when the membership function is considered as a mapping function from transverse coordinate values to vertical coordinate values (adaptation 0 to 1).

Figure 19:
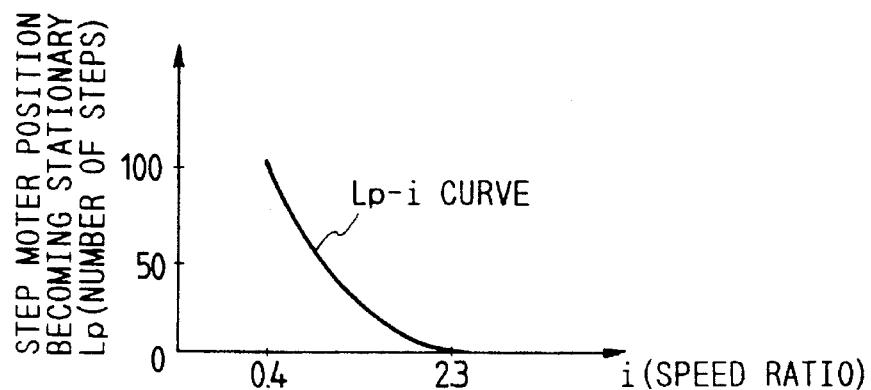
FIG. 19 is a relational curve between the speed ratio and the stationary step motor position.
Figure 20:
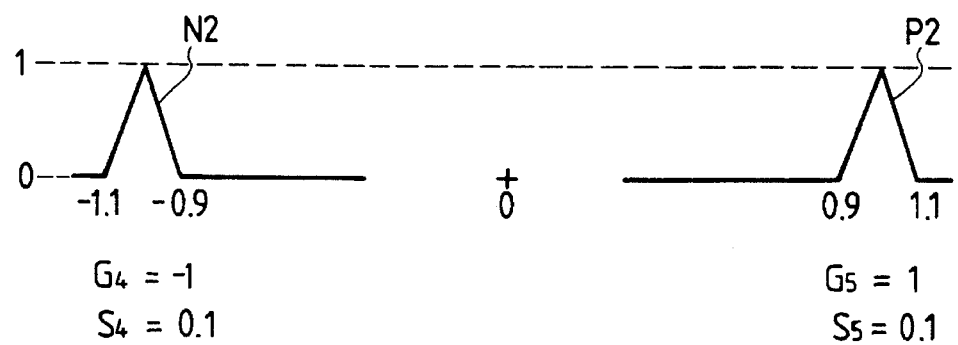
FIGS. 20 and 21 show membership functions of fuzzy logic rules 4 and 5.
Figure 21:
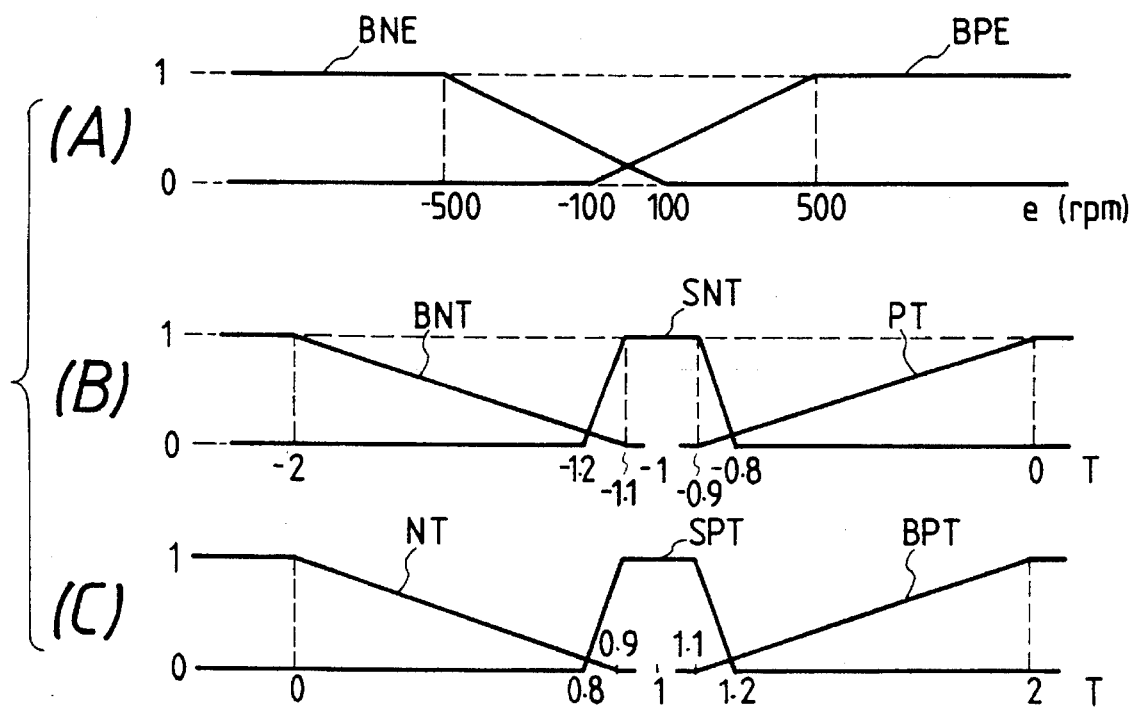

In the processing step 403, the microcomputer 511 determines the the step motor position $L_p$, which is stationary at the current speed ratio $i(0)=n°_{in}(0)/n°_{out}(0)$, using the relation shown in FIG. 19, determines e $(n_{in}(0)/n_{in})$ and Δe "e at present"—"e obtained 0.01 seconds before", and calculates a step motor control index value Tp using the current position $L_s$ of the step motor which is obtained in the processor 411 0.01 seconds before:

$$T_p = (Ls - Lp) \cdot \frac{\Delta e}{e}$$

There are two fuzzy logic rules available as shown below.
(Fuzzy logic rule 4)
When the following are satisfied:
e is negative and large, and Tp is positive, or
e is negative and large, and Tp is negative and large, or
e is positive and large, and Tp is positive and small,
the microcomputer 511 allows the step motor to run in the direction where the speed raio increases.

(Fuzzy rule 5)
When the following are satisfied:
e is positive and large, and Tp is negative, or
e is positive and large, and Tp is positive and large, or
e is positive and large, and Tp is positive and small,
the microcomputer 511 allows the step motor to run in the direction where the speed raio decreases.

The microcomputer 511 determines the first target value ΔI of step motor movement on the basis of the above two rules, and goes to a processor 404. The first target value ΔI is determined from the following expression:

$$\Delta I = \frac{\sum_j y_j \cdot G_j \cdot S_j}{\sum_j y_j \cdot S_j}, j = 4, 5$$

Symbols $G_j$ and $S_j$ in the above expression indicate a gravity center and an area of the membership functions (see FIG. 20) of the fuzzy logic rules 4 and 5 such as:

the microcomputer 511 allows the step motor to run in the direction where the speed raio increases (N2), and the microcomputer 511 allows the step motor to run in the direction where the speed raio decreases (P2). A symbol $y_j$ indicates the adaptation of each of N2 and P2. When the adaptation at e and T of the membership functions of the fuzzy logic rules 4 and 5 shown below:

e is negative and large (BNE),
e is positive and large (BPE),
Tp is negative (NT),
Tp is positive (PT),
Tp is negative and large (BNT),
Tp is positive and large (BPT),
T is negative and small, and
Tp is positive and small (SPT), is expressed by $x_7$, $x_8$, $x_9$, $x_{10}$, $x_{11}$, $x_{12}$, $x_{13}$, and $x_{14}$, the adaptation $y_j$ is determined by the following expressions (see FIG. 21):

$$y_4 = \max\{\min[x_7, \max(x_{10}, x_{11})], \max(x_8, x_{13})\},$$

$$y_5 = \max\{\min(x_7, x_{14}), \min[x_8, \max(x_9, x_{12})]\},$$

The microcomputer 511 calculates:

$$I \leftarrow I + \Delta I$$

in the processor 404 and goes to the next processor 405.

The microcomputer 511 makes a branching judgment that when $k_2 - 1 \leq I \leq k_2$ ($k_2$: a constant between 0 and 1) in the processor 405, it goes to the processor 406 or in other cases, the microcomputer 511 goes to the processor 407.

In the processor 406, the microcomputer 511 inputs "SMFLAG 0" at the address of the operation instruction flag (SMFLAG) of the actuator II.

In the processor 407, the microcomputer 511 makes a condition branching judgment; that is, when $I > k_2$, it goes to the processor 408 or in other cases, it goes to the processor 409.

In the processor 408, the microcomputer 511 performs the following processing:

$$I \leftarrow I - 1, \text{ and}$$

$$SMFLAG \leftarrow 1,$$

and goes to the processor 410.

In the processor 409, the microcomputer 511 performs the following processing:

$$I \leftarrow I + 1, \text{ and}$$

SMFLAG←−1 and goes to the processor 410.

In the processor 410, the microcomputer 511 goes and checks the value of the operation quantity instruction flag (SMFLAG). When the value is 0, the microcomputer 511 issues the operation instruction 4211 for keeping the actuator II off. When the value is 1, the microcomputer 511 issues the operation instruction 4211 for rotating the actuator II by one step so as to decrease the speed ratio. When the value is −1, the microcomputer 511 issues the operation instruction 4211 for rotating the actuator II by one step so as to increase the speed ratio. Then, the microcomputer 511 goes to the processor 411. In the processor 411, the microcomputer 511 performs the following processing:

$$L_s \rightarrow L_s \text{ for SMFLAG=0}$$

$$L_s \rightarrow L_s + 1 \text{ for SMFLAG=0}$$

$$L_s \rightarrow L_s - 1 \text{ for SMFLAG=0}$$

Figure 22:
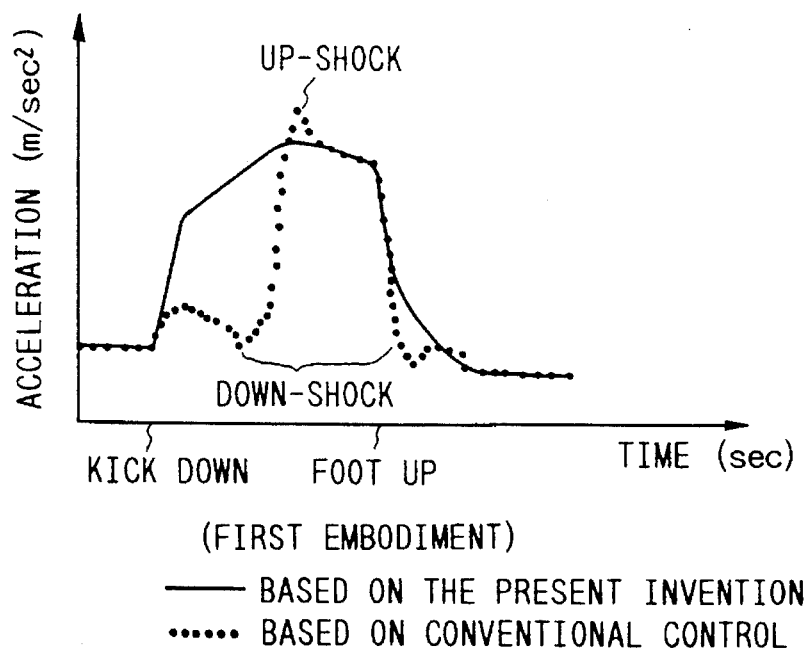
FIG. 22 is a comparison diagram between the acceleration waveform of this embodiment at the time of kickdown and the acceleration waveform when only the conventional speed ratio control is used.

For comparison of the control method of this embodiment only with the speed ratio control of the conventional proportion and integration control method (the operation quantity is calculated by proportion and integration of e in the processor 1107 of this method), the vehicle acceleration responses when kicked down and foot up during stationary running of a vehicle velocity of 40 km/h are shown in FIG. 22. FIG. 22 shows that by using this control method, the acceleration is changed smoothly (free of down-shock and up-shock) and the promptness is improved.

Figure 23:
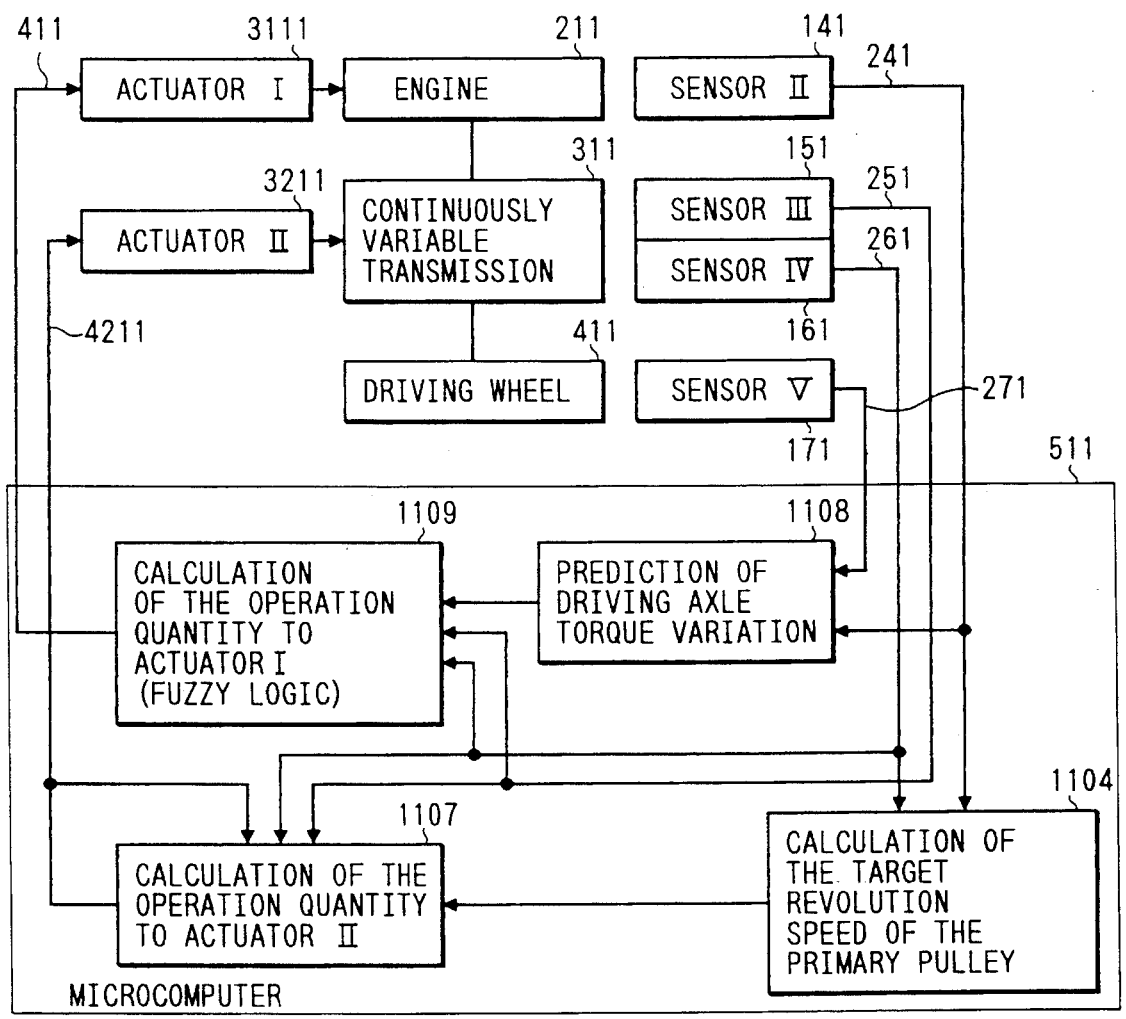
FIG. 23 is a block diagram of the third embodiment of the present invention.

The third embodiment of the present invention will be described with reference to FIGS. 23 to 27. FIG. 23 shows the structure of this embodiment. The differences from the second embodiment are that a sensor V (back and forth acceleration sensor) 171 is used in place of the sensor I (engine revolution speed sensor) 131 and a driving axle torque variation prediction processor 1108 and an operation instruction calculation processor 1109 to the actuator I are used for processing of the microcomputer 511 in place of the vehicle acceleration variation prediction processor 1101 and the operation instruction calculation processor 1102 to the actuator I. Next, the flow chart of the processing procedure of the microcomputer 511 which is different from that of the second embodiment will be described.

Figure 24:
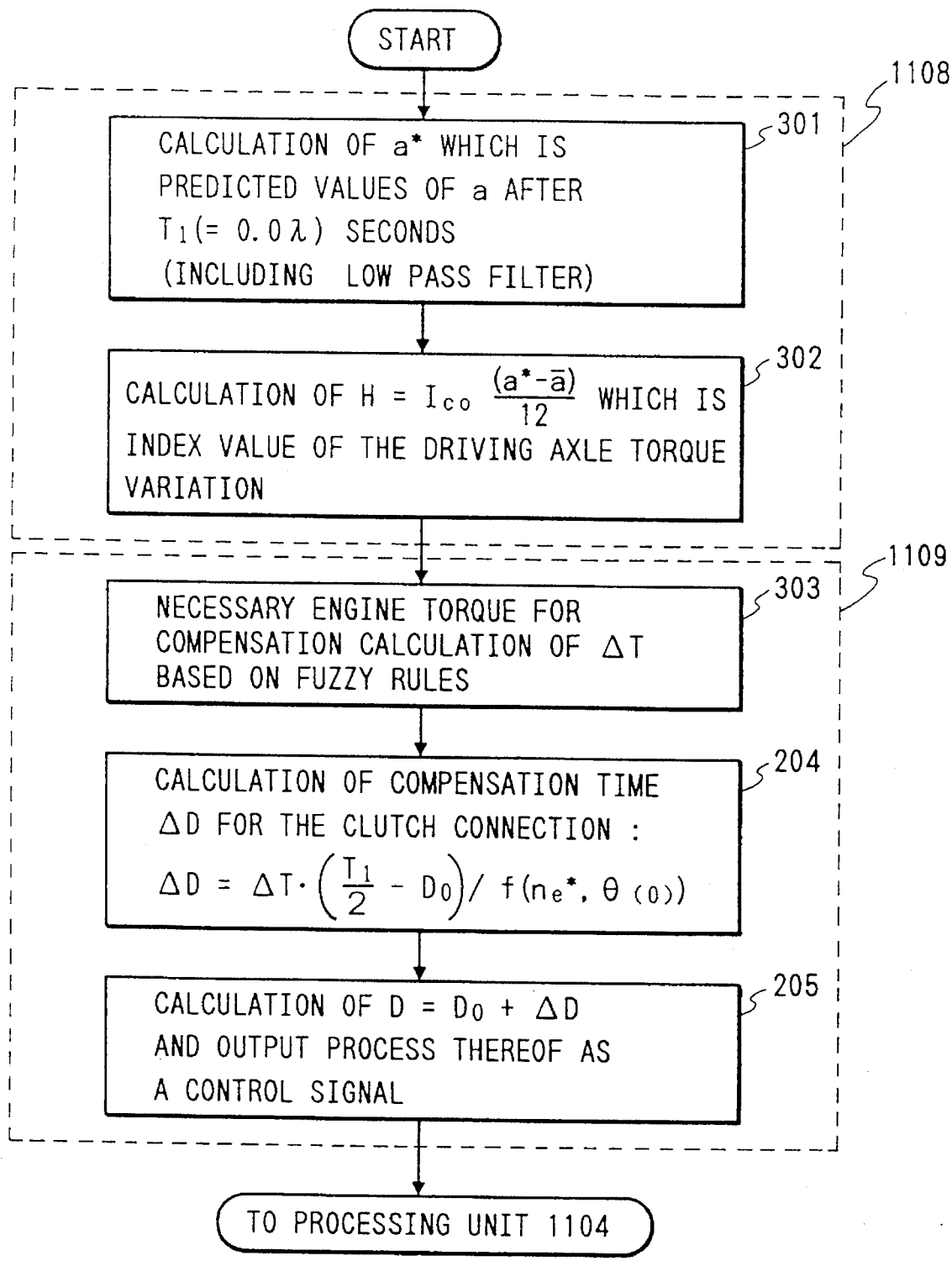
FIG. 24 is a microcomputer processing flow chart.
Figure 25:
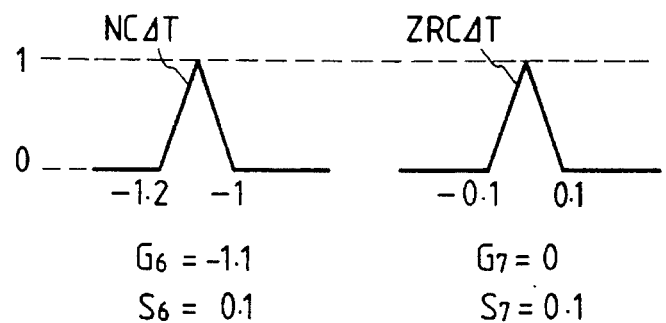
FIGS. 25 and 26 show membership functions of fuzzy rules 6 and 7.
Figure 26:
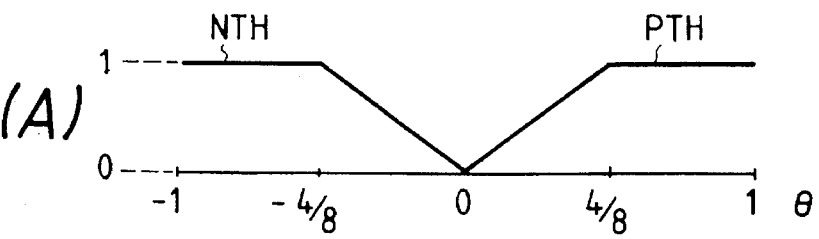
Figure 26:
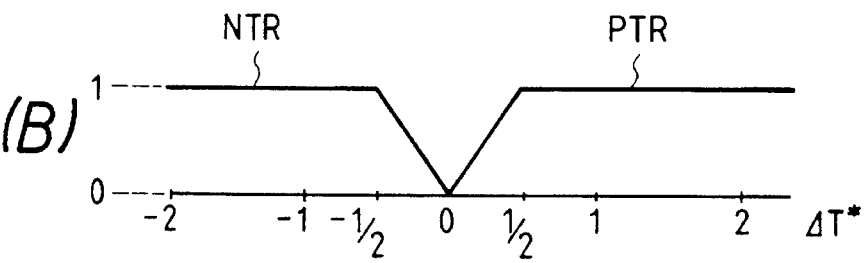

FIG. 24 shows a detailed processing flow chart of the driving axle torque variation prediction processor 1108 and the operation instruction calculation processor 1109 to the actuator I. In a processor 301, the microcomputer 511 determines the moving average (output of the low-pass filter) from time series data of acceleration information 271 detected by the back and forth acceleration sensor 171 shown in FIG. 23:

$$a(k) \; (k = 0, -1, \ldots, -44)$$

(Acceleration measured "k×−0.01" seconds before) using:

$$\bar{a}(k) = \frac{1}{45} \sum_k a(k), k = 0, \ldots, -44$$

and determines the predicted value a* of the vehicle back and forth acceleration with the body vibration component excluded $T_1$ seconds later from:

$$a^* = \bar{a}(0) + 6 [\bar{a}(0) - \bar{a}(-4)]$$

and goes to a processor 302. "a(−4)" in the above expression indicates a moving average calculated 0.04 seconds before. In the processor 302, the microcomputer 511 determines a driving axle torque variation index value H from the following expression:

$$H = I_{co}(a^* - \bar{a}(0))/12$$

and goes to a processor 303. A symbol $I_{co}$ indicates moment of inertia for the system from the secondary pulley to the drive wheel+ vehicle inertial reflected at the driving axle. In the processor 303, the microcomputer 511 determines $\Delta\theta$ (throttle opening $\theta(0)$ measured at this time throttle opening $\theta(-100)$ calculated 1 second before) and $\Delta t^* = H \cdot n_{out}(0)/n_{in}(0)$.

There are three fuzzy logic rules available as shown below.

(Fuzzy logic rule 6)

When $\Delta\theta$ is positive and $\Delta T^*$ is negative: the coefficient $\Delta T$ is negative.

When $\Delta\theta$ is negative and $\Delta T^*$ is positive: the coefficient $\Delta T$ is negative.

(Fuzzy logic rule 7)

When $\Delta\theta$ is positive and $\Delta T^*$ is positive: the coefficient $\Delta T$ is zero.

When $\Delta\theta$ is negative and $\Delta T^*$ is negative: the coefficient $\Delta T$ is zero.

On the basis of the above three rules, the microcomputer 511 determines necessary correction engine torque $\Delta T$ from the following expression:

$$\Delta T = \Delta T^* \cdot \text{coefficient } \Delta T$$

and goes to the processor 204. The coefficient $\Delta T$ is determined from the following expression:

$$\text{Coefficient } \Delta T = \left( \frac{\sum_i y_i \cdot G_i \cdot S_i}{\sum_i y_i \cdot S_i} \right) \quad i = 6, 7$$

Symbols $G_i$ and $S_i$ in the above expression indicate a gravity center and an area of the membership functions (see FIG.

25) of the fuzzy logic rules 6 and 7 such as:

A symbol $y_i$ indicates the adaptation of each of NCΔT and ZRCΔT. When the adaptation at Δθ and ΔT* of the membership functions of the fuzzy logic rules 6 and 7 shown below:

Δθ e is negative (NTH),
Δθ is positive (PTH),
ΔT* is negative (NTR), and
ΔT* is positive (PTR), is expressed by $x_{15}$, $x_{16}$, $x_{17}$, and $x_{18}$, the adaptation $y_i$ is determined by the following expressions (see FIG. 26):

$$y_6 = \max\{\min(x_{15}, x_{16}), \min(x_{16}, x_{17})\},$$

$$y_7 = \max\{\min(x_{15}, x_{17}), \min(x_{16}, x_{18})\},$$

The other processing of the microcomputer 511 is the same as that of the second embodiment. Therefore, the description thereof will be omitted.

Figure 27:
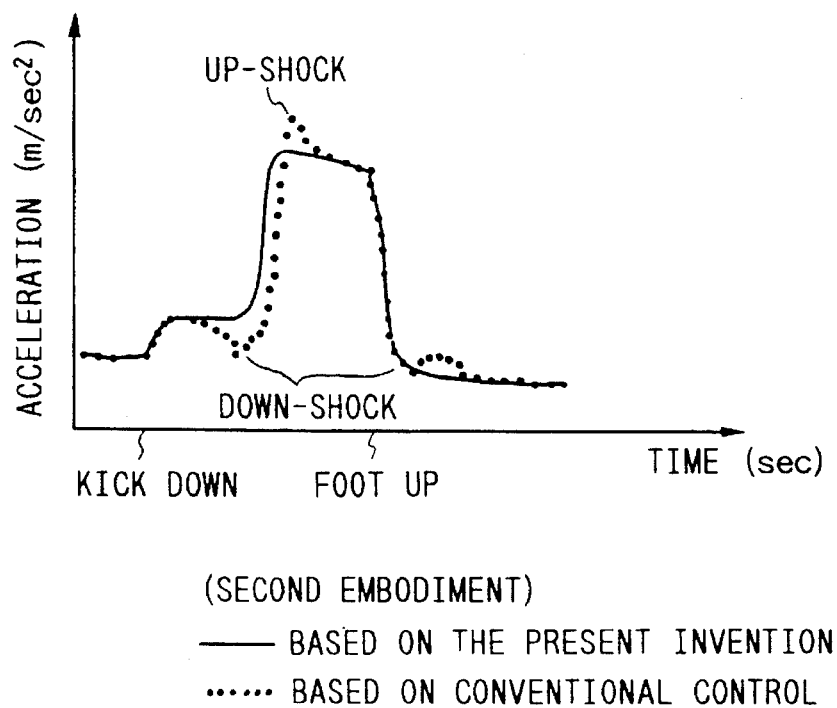
FIG. 27 is a control performance comparison chart.

For comparison between the control method of this third embodiment and the conventional control method, the vehicle acceleration responses when kicked down and foot up during stationary running of a vehicle velocity of 40 km/h are shown in FIG. 27. The drawing shows that by using this control method, the acceleration is changed smoothly and the promptness is superior. Although the promptness is inferior to that of the second embodiment, the request level for the engine torque control is low.

In the second and third embodiments, the engine torque is adjusted by super charger control. However, the engine torque may be adjusted by fuel injection quantity control, ignition timing control, or electronic throttle control.

The fourth embodiment o# the present invention will be described with reference to FIGS. 28 to 32. FIG. 28 shows the structure of this embodiment. The differences from the second embodiment are that the actuator I (electromagnetic clutch) 3111 is removed and an apparatus for inputting stationary speed ratio characteristics 2811 and an apparatus for inputting transient speed ratio characteristics 2812 are additionally installed in place of the sensor I (engine revolution speed sensor) 131. The apparatus for inputting stationary speed ratio characteristics 2811 outputs information for setting the ratio of speed ratio characteristics 2111 in accordance with the position setting by the slide volume of a driver 281. The apparatus for inputting transient speed ratio characteristics 2812 outputs speed ratio velocity setting information 2211 in accordance with the position setting by another slide volume of the driver 281. The microcomputer 511 calculates the operation quantity to the actuator II (step motor) 3211 using the information for setting the ratio of speed ratio characteristics 2111, the speed ratio velocity setting information 2211, the throttle opening information 241, the primary pulley revolution speed information 251, and the secondary pulley revolution speed information 261, and outputs the operation instruction 4211. The operation of the actuator II3211 is the same as that of the second embodiment. Next, the processing contents of the microcomputer 511 which is an essential section of this patent will be described.

Figure 30:
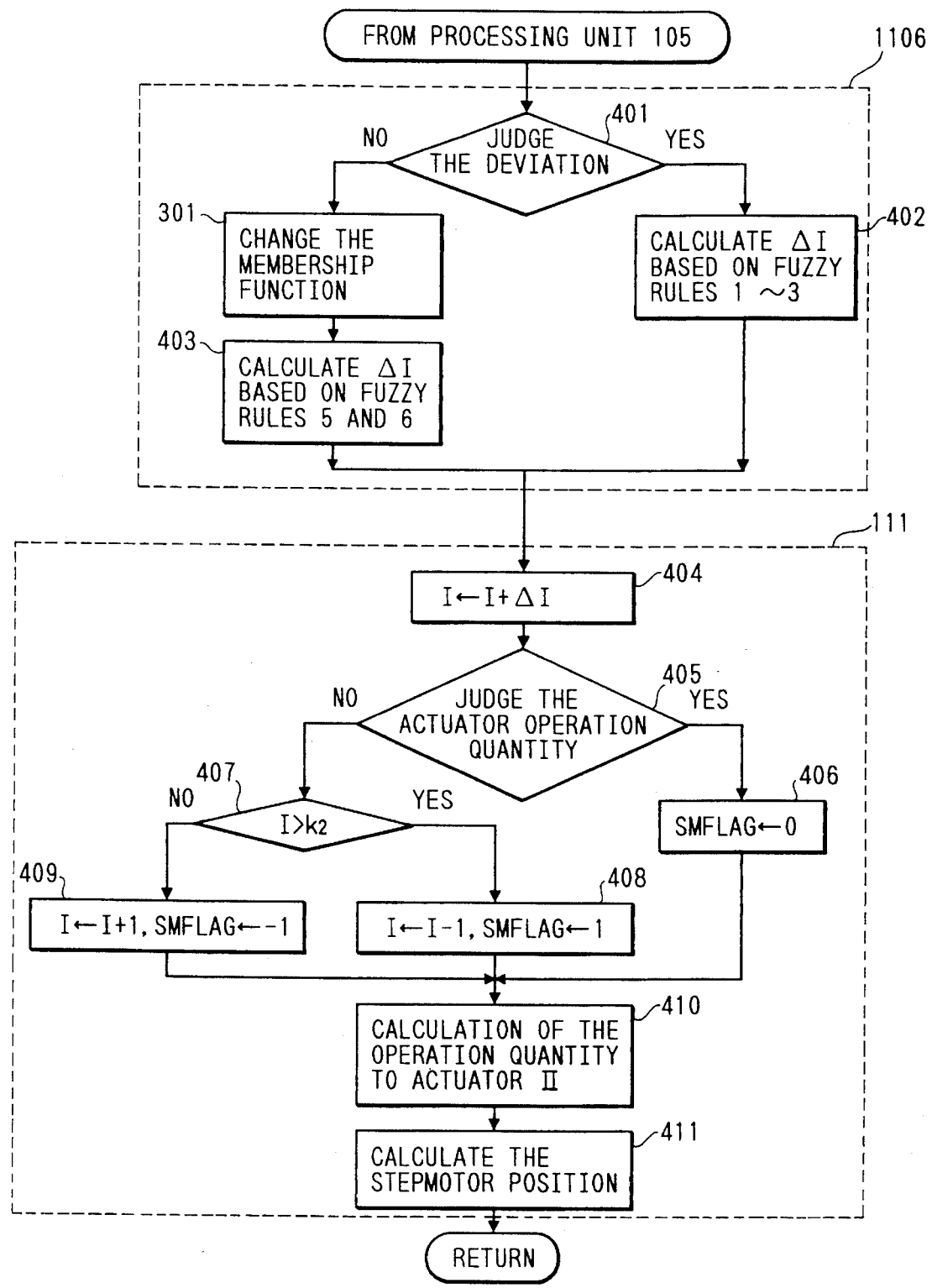
FIG. 30 is a microcomputer processing flow chart.
Figure 31:
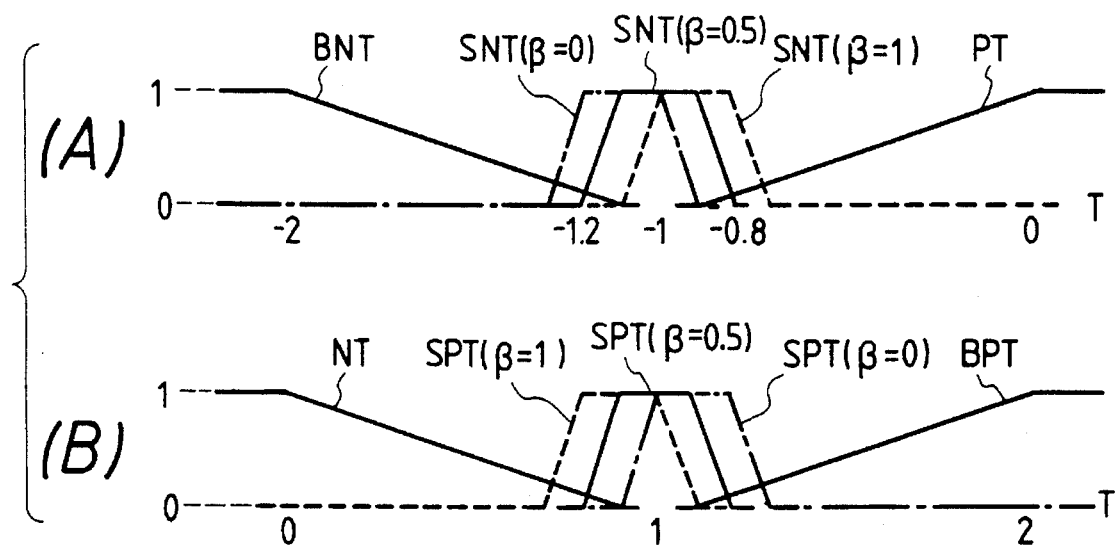
FIG. 31 is an illustration for changing the membership functions of the fuzzy rules 4 and 5.

A rough flow chart of the processing of the microcomputer 511 is shown in FIG. 28. In a processor for setting the ratio of speed ratio characteristics for the continuously variable transmission and the finite speed automatic transmission 1103, the microcomputer 511 stores that the driver's desire ratio of the speed ratio characteristics for the continuously variable transmission to the speed ratio characteristics for the finite speed automatic transmission is (1−α): α on the basis of the value α (0≦α≦ 1) of the information for setting the ratio of speed ratio characteristics 2111, and goes to a target primary pulley revolution speed calculation processor 1110. In the processor 1110, the microcomputer 511 calculates the target primary pulley revolution speed $n_{in}1$ for α=0 from the relational curves shown in FIG. 15, the throttle opening information 241, and the secondary pulley revolution speed information 261, calculates the target primary pulley revolution speed $n_{in}2$ for α=1, and a current speed among four speeds from information indicating one of the characteristic line diagram shown in FIG. 29 and a speed among four speeds obtained 0.005 seconds before, the throttle opening information 241, and the secondary pulley revolution speed information 261, and determines the target primary pulley revolution speed $n°_{in}$ finally from the following expression:

$$n°_{in} = \alpha . n_{in}2 + (1-\alpha)n_{in}1$$

and goes to a processor for calculating necessary predicting time for reaching the target speed ratio 1105. In the processor 1105, the microcomputer 511 determines the necessary predicting time for reaching the target speed ratio NS from the primary pulley revolution speed information $251n_{in}(0)$ and the target primary pulley revolution speed information using the following expression:

$$NS = \frac{e(0)}{e(0) - e(-1)}$$

where:

$$e(0) = n_{in}(0) - n°_{in},$$

and e(−1)= e(0) obtained 0.005 seconds before, and goes to a speed ratio velocity correction processor 1106. FIG. 30 shows a detailed processing flow chart of the processors 1106 and 1111. The only one difference from the processing of the processor 1107 (FIG. 16) in the second embodiment is that a membership function changing section 301 is added. In the membership function changing section 301, the microcomputer 511 moves the membership functions SNT and SPT of the fuzzy rules 5 and 6 continuously to the right or left by linear interpolation on the basis of the value β (0≦β≦ 1) of the speed ratio velocity setting information 2211 (the cases of β=0.05 and 1 are shown in FIG. 31). The transverse coordinate value T of each of the membership functions is determined from the following expression using the necessary predicting time for reaching the target speed ratio NS obtained in the processor 1105:

$$T = (L_s - L_p)/NS$$

Figure 32:
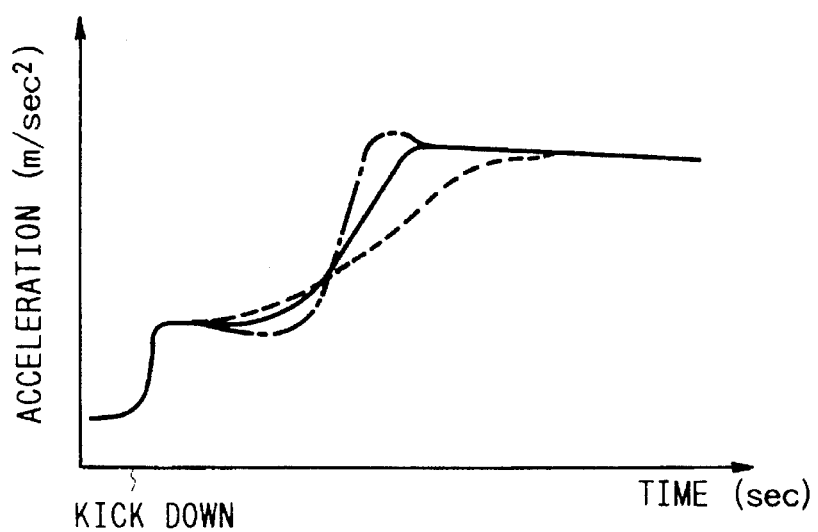
FIG. 32 is a difference diagram of the acceleration response when kicked down when the speed ratio velocity setting is changed.

The operations of the other processors are the same as those of the second embodiment. Therefore, the description thereof will be omitted. The vehicle acceleration responses when kicked down during running of 40 km/h when the value β of the speed ratio velocity setting information 2211 is 0.05 or 1 in this embodiment are shown in FIG. 32.

Figure 29:
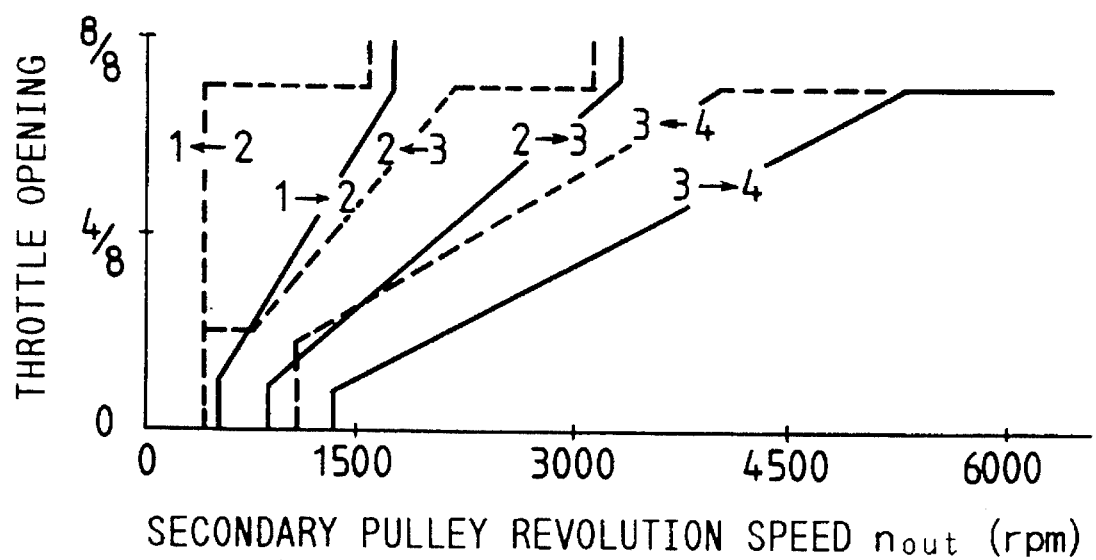
FIG. 29 shows gear shift lines for four-speed automatic transmission.

In this embodiment, the four-speed automatic transmission shown in FIG. 29 is used as a speed ratio characteristic for the finite speed automatic transmission. However, threespeed, five-speed, or more-speed automatic transmission may be used, and selection of the number of speeds by a driver can be easily realized by using an interface such as a CRT.

Finally, the fifth embodiment of the present invention will be described with reference to FIGS. 33 to 50.

Figure 33:
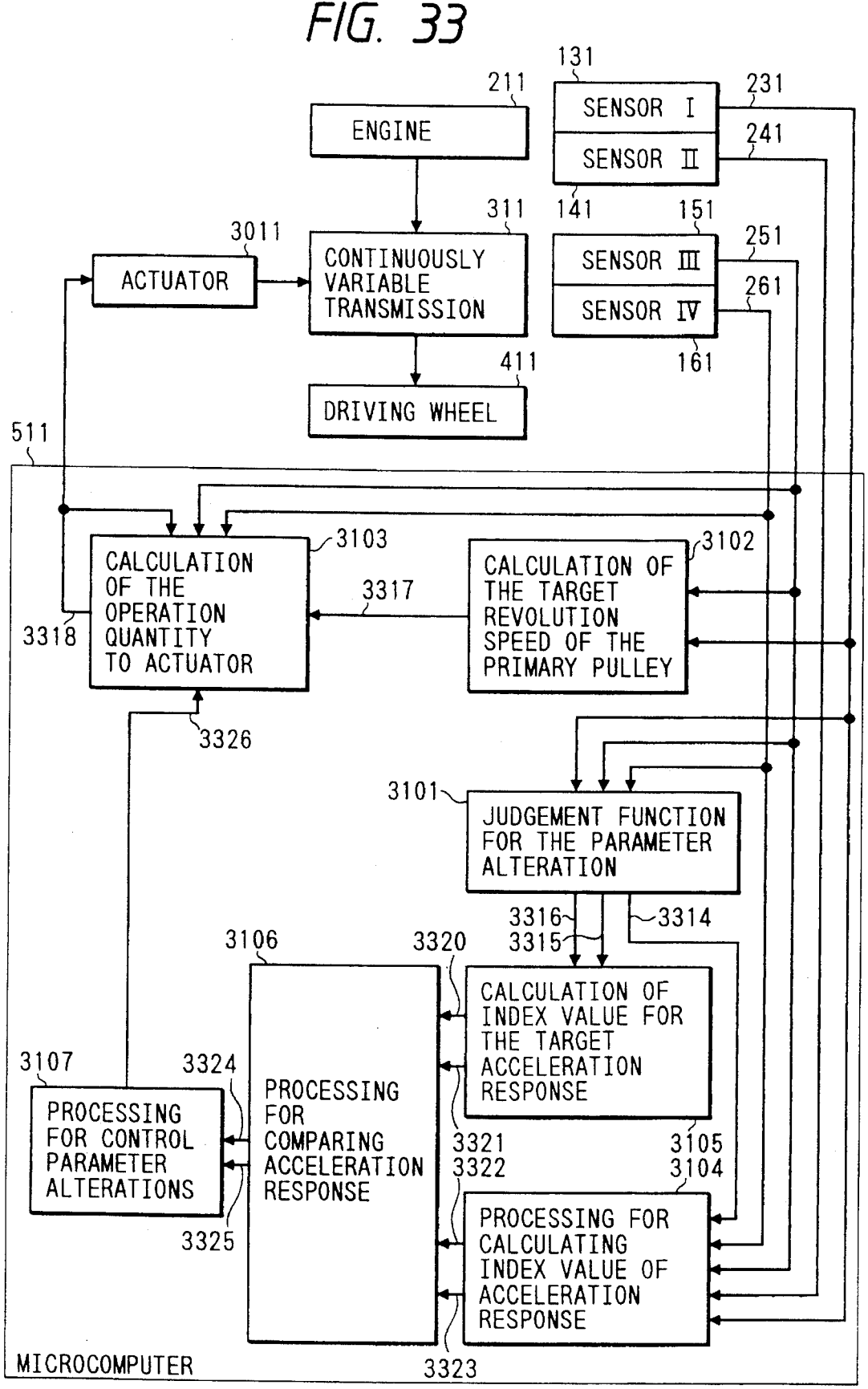
FIG. 33 is a block diagram of the fifth embodiment of the present invention.

FIG. 33 shows the structure of this embodiment. In a vehicle which is driven by transmitting the drive force of an engine 211, which is a power source, to a drive wheel 411 via a continuously variable transmission 311, the microcomputer 511 calculates an operation instruction 3318 to an actuator (step motor) 3011 and a change value 3326 of the control parameter which is used for calculation of the above operation instruction 3318 on the basis of four types of information such as throttle opening information 231, secondary pulley revolution speed information 241, primary pulley revolution speed information 251, and engine revolution speed information 261 which are outputs from running status sensors (a sensor I131 (throttle opening), a sensor II141 (engine revolution speed sensor), a sensor III151 (primary pulley revolution speed sensor), and a sensor IV161 (output pulley revolution speed sensor), outputs the instruction to the actuator 3011, and changes the control parameter of the operation instruction calculation processor 3103 to the actuator according to the change value 3326.

The actuator 3011 controls the speed ratio of the continuously variable transmission 311 on the basis of the operation instruction 3318 calculated by the microcomputer 511.

Figure 34:
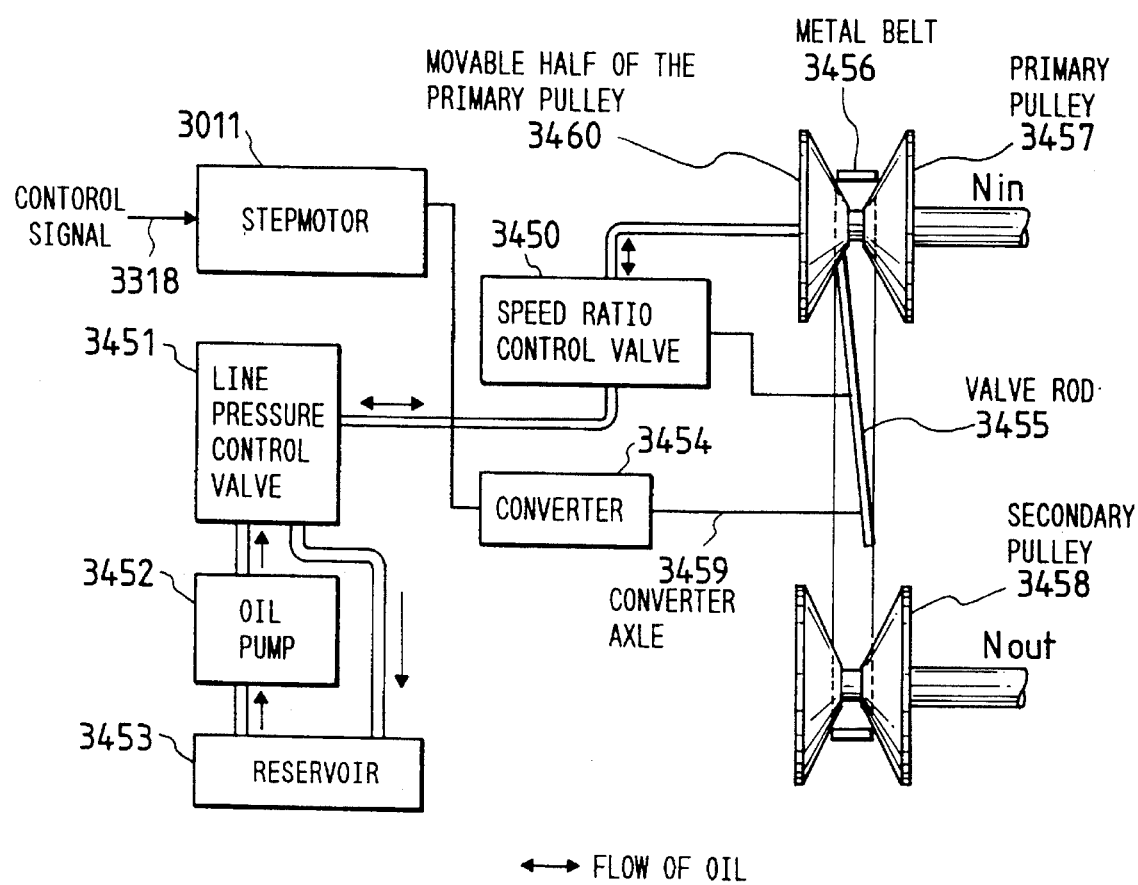
FIG. 34 is a block diagram of a continuously variable transmission.

The speed changing method of the continuously variable transmission 311 using the actuator 3011 is the same type as that indicated in Japanese Patent Application Laid-Open No. 1984-47553 as shown in FIG. 34. The actuator 3011 decreases the speed ratio (output side belt running diameter / input side belt running diameter or revolution speed $n_{in}$ of a primary pulley 3457/revolution speed $n_{out}$ of a secondary pulley 3458) by pouring high pressure oil into the primary pulley 3457 of the continuously variable transmission 311 by operating a speed ratio control valve 3450 via a converter 3454 and a valve rod 3455 or increases the speed ratio by returning the oil from the primary pulley 3457 to a reservoir.

One end of the valve rod 3455 is in contact with the inner conical surface of the movable half 3460 of the primary pulley 3457 and the other end of the valve rod 3455 is in contact with a shaft 3459 of the converter 3454.

The drive torque of the continuously variable transmission 311 is transmitted sequentially to the primary pulley 3457, a metal belt 3456, and a secondary pulley 3458.

Figure 35:
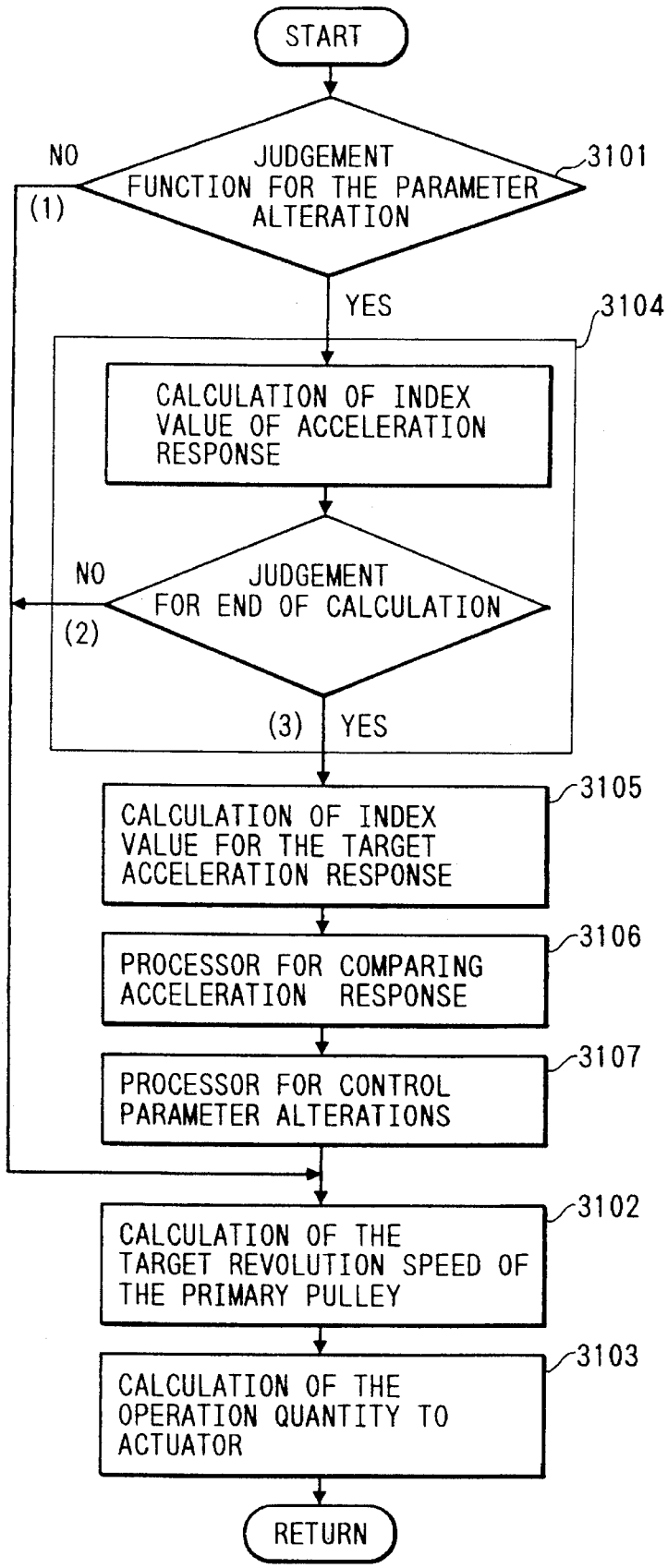
FIG. 35 shows the processing outline of a microcomputer.

Next, the processing contents of the microcomputer 511 which is an essential section of the present invention will be described with reference to FIGS. 33 and 35.

Using the throttle opening information 231, the engine revolution speed information 241, the primary pulley revolution speed information 251, and the secondary pulley revolution speed information 261, the microcomputer 511 makes a condition branching judgment for whether or not to change the parameter for actuator operation instruction calculation by the judgment function for parameter alteration 3101. When changing the parameter, the microcomputer 511 goes to a processor for calculating an index value of acceleration response 3104. In other cases, the microcomputer 511 goes to a processor for calculating a target primary pulley revolution speed 3102.

In the processor 3104, the microcomputer 511 calculates acceleration response index values 3322 and 3323, and goes to the processor 3102 until the calculation of index values 3322 and 3323 is finished. When the calculation of index values is finished, the microcomputer 511 goes to a memory of index value for target acceleration response 3105, a processor for comparing acceleration response 3106, and a processor for control parameter alteration 3107.

In the processor 3105, the microcomputer 511 calculates target index values 3320 and 3321.

In the processor 3106, the microcomputer 511 compares the index values 3322 and 3323 calculated in the processor 3104 with the target index values 3320 and 3321.

In the processor 3107, the microcomputer 511 changes the parameter to be used for actuator operation instruction calculation on the basis of comparison results 3324 and 3325 and goes to the processor 3102.

In the processor for calculating target primary pulley revolution speed 3102, the microcomputer 511 calculates a target primary pulley revolution speed 3317. In the processor for calculating actuator operation instruction 3103, the microcomputer 511 calculates an operation instruction value to the actuator on the basis of the target primary pulley revolution speed 3317, the primary pulley revolution speed information 251, the secondary pulley revolution speed information 261, and the past operation instruction 3318, and outputs an operation instruction 3318.

The above series of processing is divided into three parts (1), (2), and (3) by each condition branch, and all the actuator operation instructions are performed every 0.01 seconds.

Figure 36:
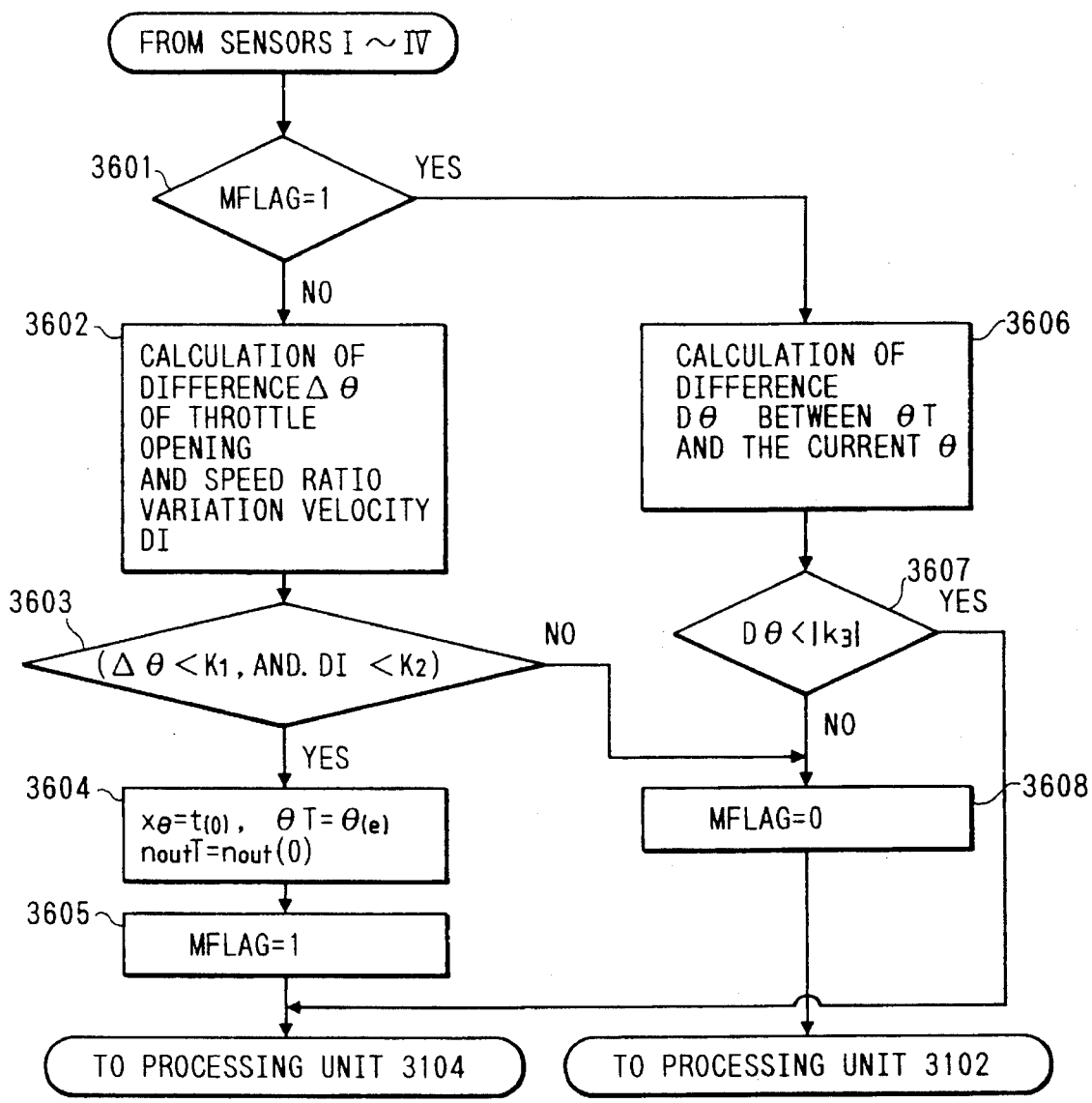
FIGS. 36, 38, and 44 are microcomputer processing flow charts.

FIG. 36 shows a detailed processing flow chart of the judgment function for parameter alteration 3101.

In a processor 3601, the microcomputer 511 determines whether the processing in execution is (1) or (2) mentioned above from the MFLAG value. When the current processing is (1) (MFLAG= 0), the microcomputer 511 goes to a processor 3602. When the current processing is (2) (MFLAG= 1), the microcomputer 511 goes to a processor 3606.

In the processor 3602, using the calculated values at this time:

θ(0): throttle opening, $n_{in}(0)$: primary pulley revolution speed, and $n^{out}(0)$: secondary pulley revolution speed, and the measured values (−5), $n_{in}(-5)$, and $n_{out}(-5)$ 0.5 seconds before, the microcomputer 511 calculates the following:

$$\Delta\theta=\{\theta(0)-\theta(-5)\}/0.5$$

$$D\,I=\{(n_{in}(0)/n_{out}(0))-(n_{in}(-5)/n_{out}(-5))\}/0.5$$

and goes to a processor 3603.

In the processor 3603, the microcomputer 511 determines whether Δθ and DI satisfy the following conditions:

Δθ>$k_1$, and

DI<$k_2$ ($k_1$, $k_2$: constants)

When they satisfy the conditions, the microcomputer 511 goes to a processor 3604. In other cases, the microcomputer 511 goes to a processor 3608.

In the processor 3608, the microcomputer 511 leaves the MFLAG value 0 unchanged and goes to the processor for calculating target primary pulley revolution speed 3102.

In the processor 3604, the microcomputer 511 stores the time t(0), which satisfies the conditions in the processor 3603, θ(0) at that time, and $n_{out}(0)$ as shown below.

$$\begin{cases} t_0 \longleftarrow t(0) \\ \theta T \longleftarrow \theta(0) \\ n_{out}T \longleftarrow n_{out}(0) \end{cases}$$

and sets:

MFLAG=1, and goes to the processor for calculating acceleration response index value 3104.

In the processor 3606, the microcomputer 511 calculates the difference Dθ between θT, which is stored in the processor 3604, and the throttle opening at this time:

$D\theta = \theta T - \theta(0)$, and goes to a processor 3607.

In the processor 3607, the microcomputer 511 determines the following:

$D\theta < |k_3| (k_3$: a constant)

When the difference satisfies the condition, the microcomputer 511 goes to the processor for calculating an index value of acceleration response 3104. In other cases, the microcomputer 511 goes to the processor 3608, sets the following:

MFLAG → 0, and goes to the processor for calculating a target primary pulley revolution speed 3102.

Figure 37:
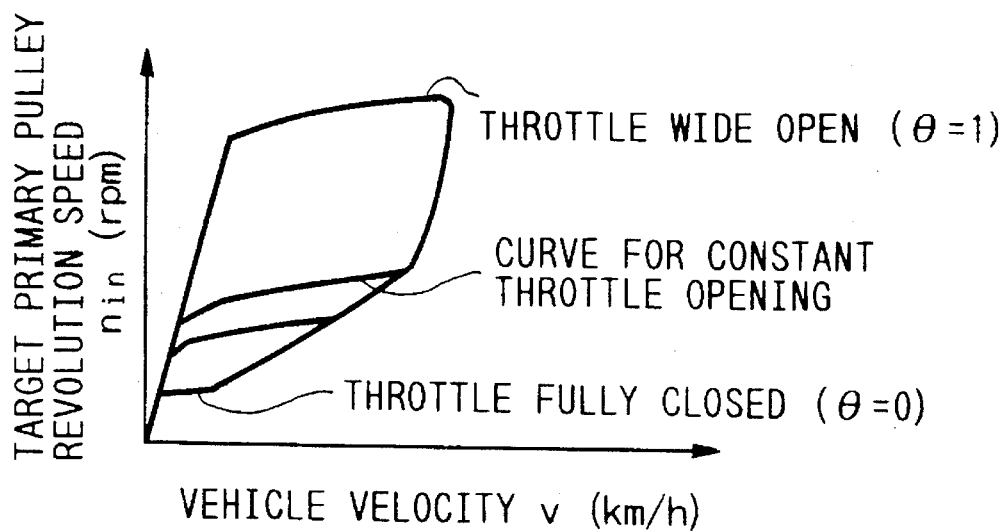
FIG. 37 is a target primary pulley revolution speed characteristic diagram.
Figure 38:
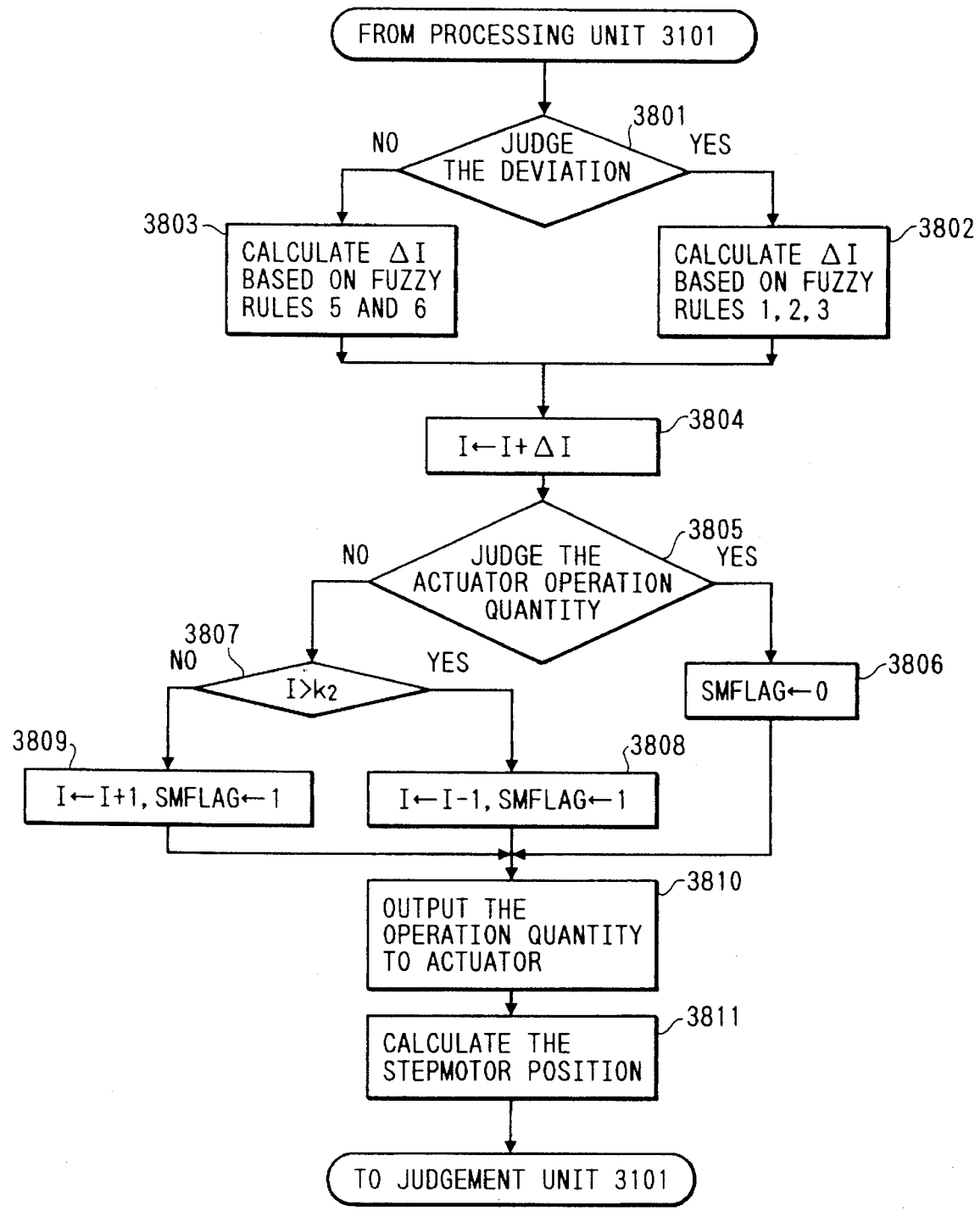
Figure 39:
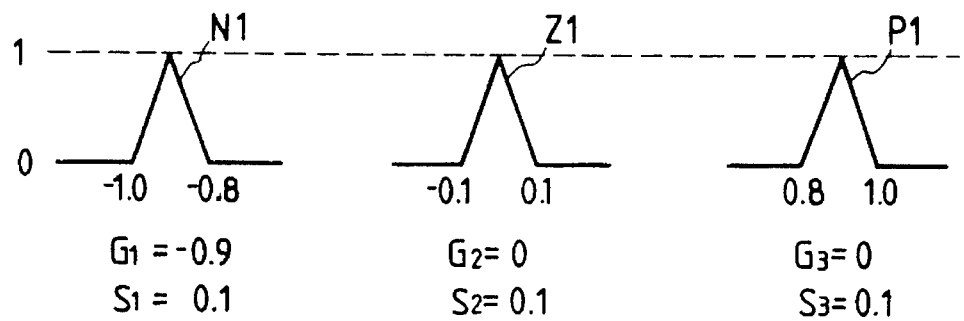
FIGS. 39 and 40 show membership functions of fuzzy logic rules 1, 2, and 3.
Figure 40:
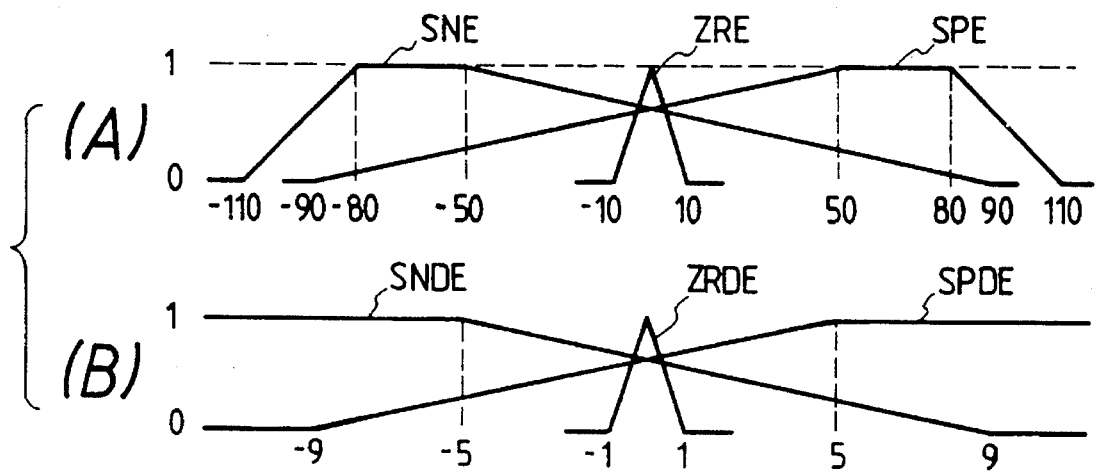

In the processor for calculating target primary pulley revolution speed 3102, the microcomputer 511 calculates the target primary pulley revolution speed $n_{in}$ 3317 from the throttle opening information 231 and the secondary pulley revolution speed information 261 using the relational curves shown in FIG. 37, and goes to the next processor 3103. FIG. 38 shows a detailed processing flow chart of the processor for calculating operation instruction 3103 to the actuator. In a deviation judgment processor 3801, the microcomputer 511 determines the difference e $(n_{in} - n°_{in})$ between the target primary pulley revolution speed $n°_{in}$ information 3317 and the primary pulley revolution speed $n_{in}$ information 251. When the absolute value |e| becomes as follows:

|e| < k (constant)

the microcomputer 511 goes to a processor 3802. In other cases, the microcomputer 511 goes to a processor 3803. In the processor 3802, the microcomputer 511 determines Δe "e at present" — "e obtained 0.01 seconds before". There are three fuzzy logic rules available as shown below.

(Fuzzy logic rule 1)
When the following are satisfied:
e is positive and small, and
Δe is positive and small,
the microcomputer 511 allows the step motor to run a little in the direction where the speed ratio increases.

(Fuzzy logic rule 2)
When the following are satisfied:

{ e is negative and small, and
  Δe is negative and small, the microcomputer 511 allows the step motor to run a little in the direction where the speed ratio decreases.

(Fuzzy rule 3)
When the following are satisfied:

{ e is zero, and
  Δe is zero, the step motor is fixed.

The microcomputer 511 determines the first target value ΔI of step motor movement on the basis of the above three rules, and goes to a processor 3804.

The first target value ΔI is determined from the following expression:

$$\Delta I = \left( \frac{\sum_i y_i \cdot G_i \cdot S_i}{\sum_i y_i \cdot S_i} \right) \quad i = 1, 2, 3$$

Symbols $G_i$ and $S_i$ in the above expression indicate a gravity center and an area of the membership functions (see FIG. 39) of the fuzzy logic rules 1 to 3 such as:
the microcomputer 511 allows the step motor to run a little in the direction where the speed ratio increases (N1),
the microcomputer 511 allows the step motor to run a little in the direction where the speed ratio decreases (P1), and
the step motor is fixed (Z1).
A symbol $y_i$ indicates the adaptation of each of N1, P1, and Z1. When the adaptation at e and Δe of the membership functions of the fuzzy logic rules 1 to 3 shown below:
e is positive and small (SPE),
Δe is positive and small (SPDE),
e is negative and small (SNE),
Δe is negative and small (SNDE),
e is zero (ZRE), and
Δe is zero (ZRDE),
is expressed by $x_1, x_2, x_3, x_4, x_5$, and $x_6$, the adaptation $y_i$ is determined by the following expressions (see FIG. 40):

$y_1 = \min. (x_3, x_4)$, $y_2 = \min. (x_5, x_6)$, and $y_3 = \min. (x_1, x_2)$.

The adaptation for each membership function means a vertical coordinate value corresponding to a transverse coordinate value when the membership function is considered as a mapping function from transverse coordinate values to vertical coordinate values (adaptation 0 to 1).

Figure 41:
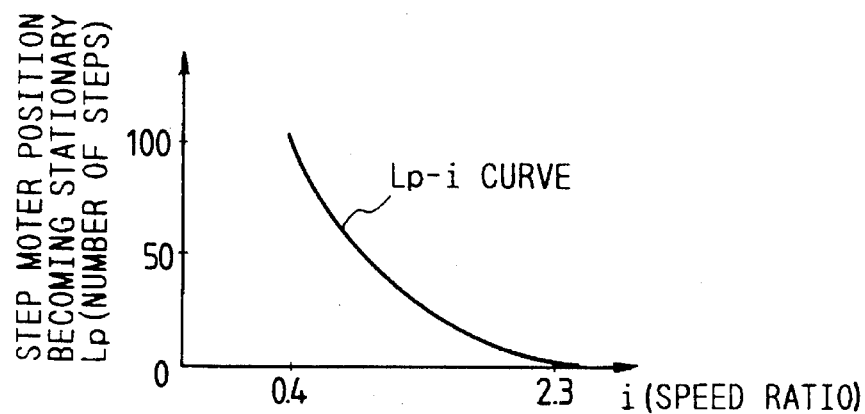
FIG. 41 is a relational curve between the speed ratio and the stationary step motor position.
Figure 42:
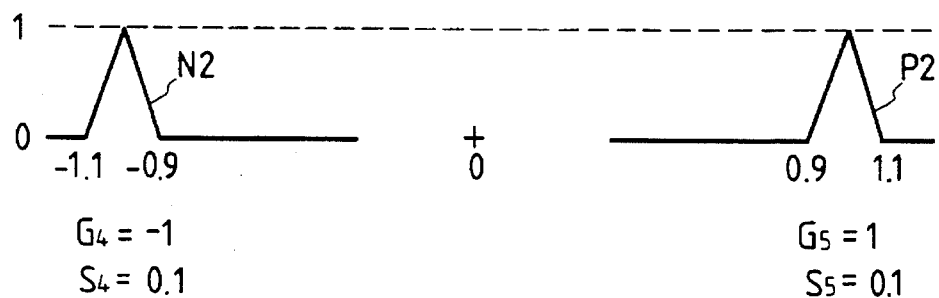
FIGS. 42 and 43 show membership functions of fuzzy rules 5 and 6.
Figure 43:
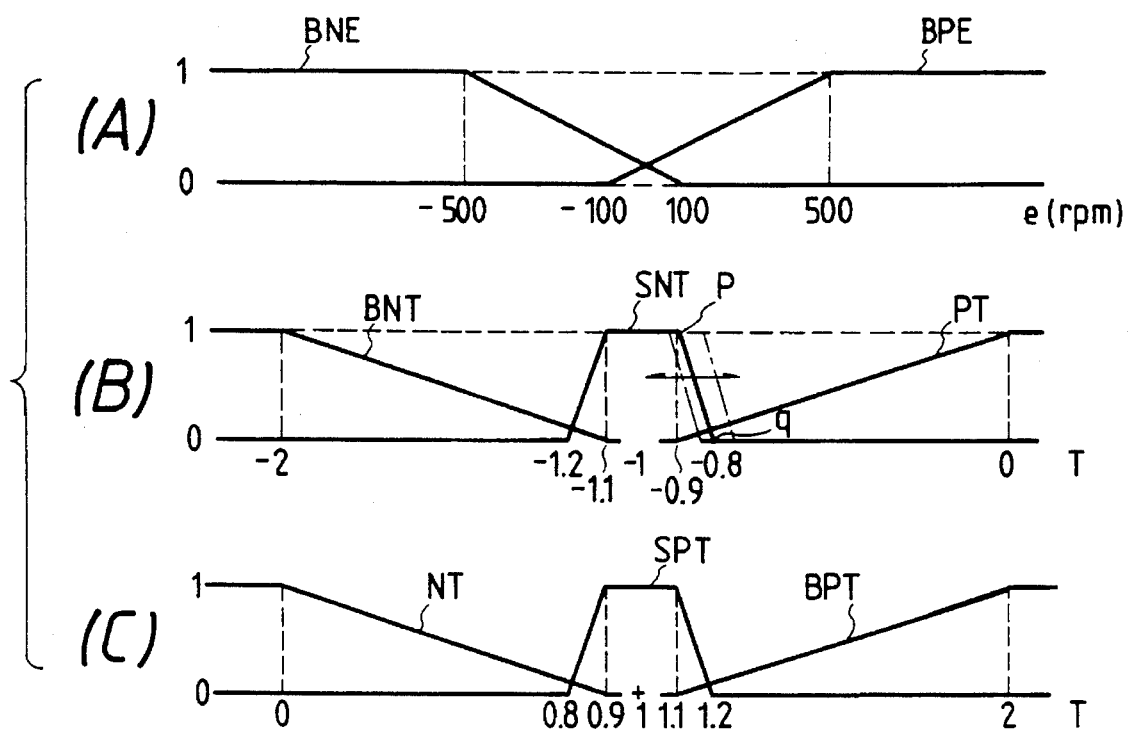

In the processor 3803, the microcomputer 511 determines the the step motor position $L_p$, which is stationary at the current speed ratio $i = n_{in}/n_{out}$, using the relation shown in FIG. 41, determines Δe $(n_{in}/n°_{in})$, which is determined in the processor 3801, and Δe (value of e "e−0.01" seconds before), and also calculates a step motor control index value T using the current position $L_s$ of the step motor which is obtained in the processor 411 0.01 seconds before:

$T = (L - L_p) \cdot \Delta e / e$

There are two fuzzy logic rules available as shown below.
(Fuzzy logic rule 4)
When the following are satisfied:
e is negative and large, and T is positive, or
e is negative and large, and T is negative and large, or
e is positive and large, and T is positive and small,
the microcomputer 511 allows the step motor to run in the direction where the speed ratio increases.
(Fuzzy logic rule 5)
When the following are satisfied:
e is positive and large, and T is negative, or
e is positive and large, and T is positive and large, or
e is positive and large, and T is positive and small,
the microcomputer 511 allows the step motor to run in the direction where the speed ratio decreases.

The microcomputer 511 determines the first target value ΔI of step motor movement on the basis of the above two rules, and goes to the processor 3804. The first target value ΔI is determined from the following expression:

$$\Delta I = \frac{\sum_j y_j \cdot G_j \cdot S_j}{\sum_j y_j \cdot S_j}, \quad j = 4, 5$$

Symbols $G_j$ and $S_j$ in the above expression indicate a gravity center and an area of the membership functions (see FIG. 42) of the fuzzy logic rules 4 and 5 such as:

the microcomputer 511 allows the step motor to run in the direction where the speed ratio increases (N2), and the microcomputer 511 allows the step motor to run in the direction where the speed ratio decreases (P2).

A symbol $y_j$ indicates the adaptation of each of N2 and P2. When the adaptation at e and T of the membership functions of the fuzzy logic rules 4 and 5 shown below:

e is negative and large (BNE),
e is positive and large (BPE),
T is negative (NT),
T is positive (PT),
T is negative and large (BNT),
T is positive and large (BPT),
T is negative and small, and
T is positive and small (SPT), is expressed by $x_7$, $x_8$, $x_9$, $x_{10}$, $x_{11}$, $x_{12}$, $x_{13}$, and $x_{14}$, the adaptation $y_j$ is determined by the following expressions (see FIG. 43):

$$y_4 = \max\{\min[x_7, \max(x_{10}, x_{11})], \min(x_8, x_{13})\},$$

$$y_5 = \max\{\min(x_7, x_{14}), \min[x_8, \max(x_9, x_{12})]\},$$

The microcomputer 511 calculates the following:

$$I \leftarrow I + \Delta I$$

in the processor 3804 and goes to the next processor 3805. The microcomputer 511 makes a branching judgment that when $k_2 - 1 \leq I \leq k_2$ ($k_2$: a constant between 0 and 1) in the processor 3805, it goes to a processor 3806, or in other cases, the microcomputer 511 goes to a processor 3807.

In the processor 3806, the microcomputer 511 inputs "SMFLAG←0" at the address of the operation instruction flag (SMFLAG) of the actuator.

In the processor 3807, the microcomputer 511 makes a condition branching judgment; that is, when I< k4 (k4: a constant), it goes to a processor 3808, or in other cases, the microcomputer 511 goes to a processor 3809. In the processor 3808, the microcomputer 511 performs the following processing:

$$I \leftarrow I - 1, \text{ and}$$

$$\text{SMFLAG} \leftarrow 1$$

and goes to a processor 3810.

In the processor 3809, the microcomputer 511 performs the following processing:

$$I \leftarrow I + 1, \text{ and}$$

$$\text{SMFLAG} \leftarrow -1,$$

and goes to the processor 3810.

In the processor 3810, the microcomputer 511 goes and checks the value of the operation quantity instruction flag (SMFLAG). When the value is 0, the microcomputer 511 issues an operation instruction 18 for keeping the actuator off. When the value is 1, the microcomputer 511 issues the operation instruction 18 for rotating the actuator by one step so as to decrease the speed ratio. When the value is 1, the microcomputer 511 issues the operation instruction 18 for rotating the actuator by one step so as to increase the speed ratio. Then, the microcomputer 511 goes to the processor 3811.

In the processor 3811, the microcomputer 511 performs the following processing:

$L_s \leftarrow L_s$ for SMFLAG=0

$L_s \leftarrow L_s + 1$ for SMFLAG=1

$L_s \leftarrow L_s - 1$ for SMFLAG=-1

Figure 44:
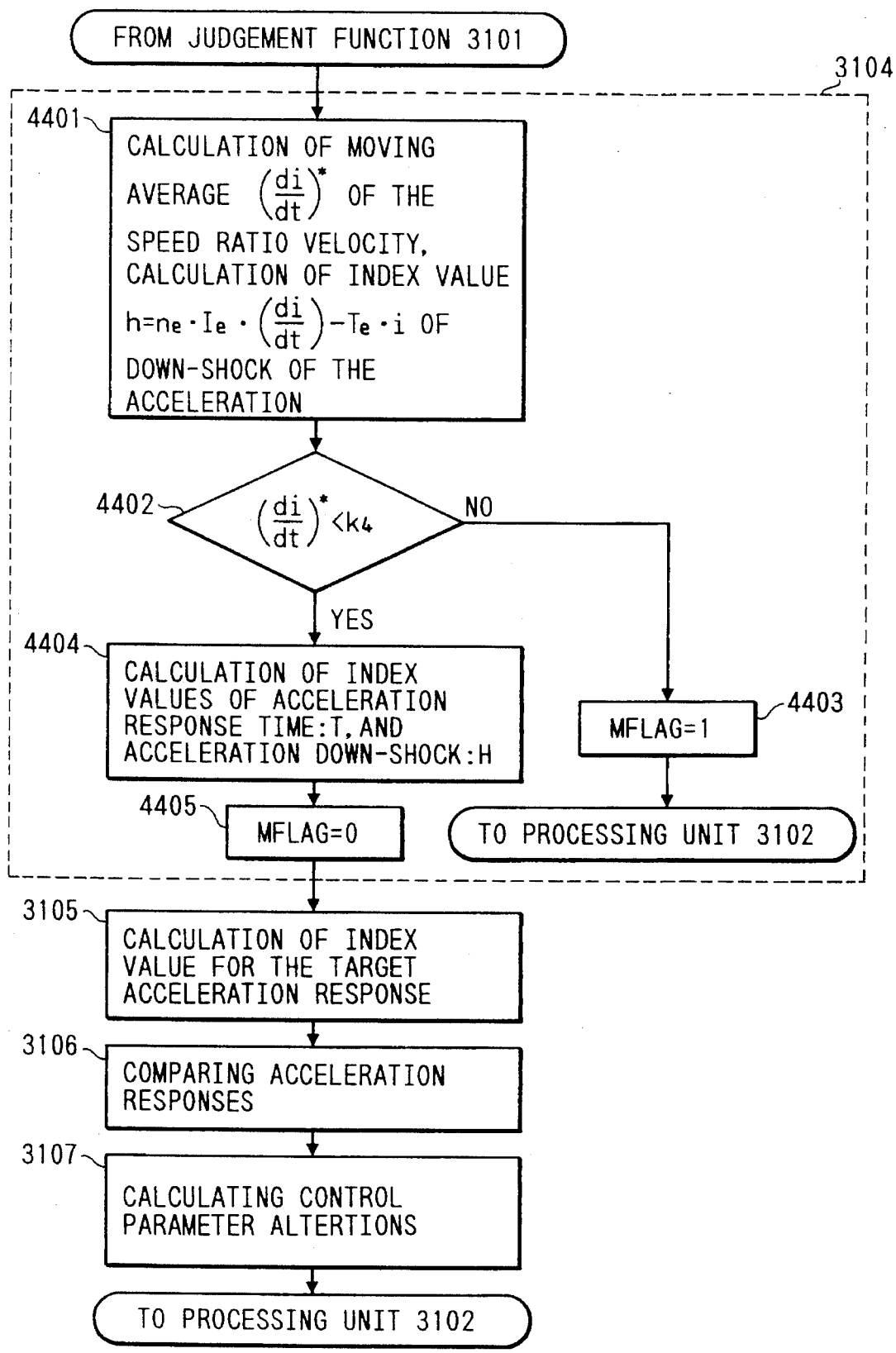
Figure 46:
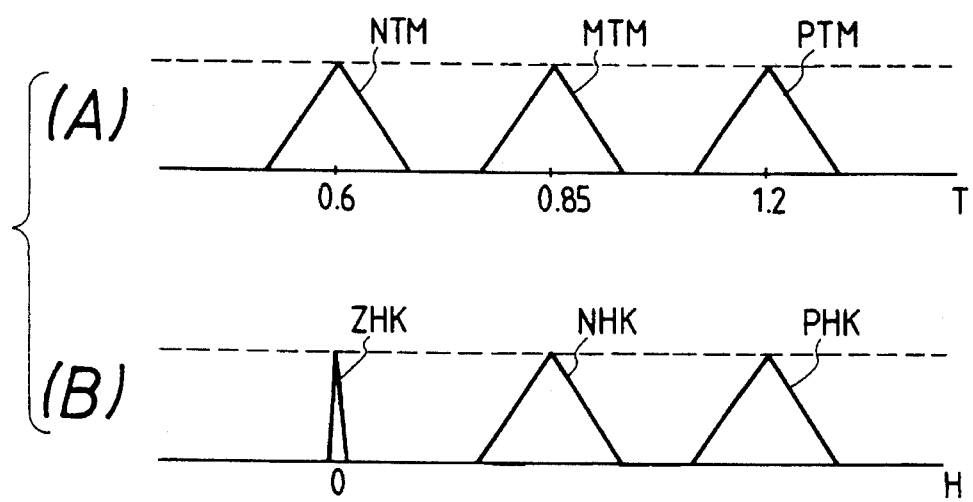
FIGS. 46 and 47 show membership functions of fuzzy logic rules 8, 9, and 10.
Figure 47:
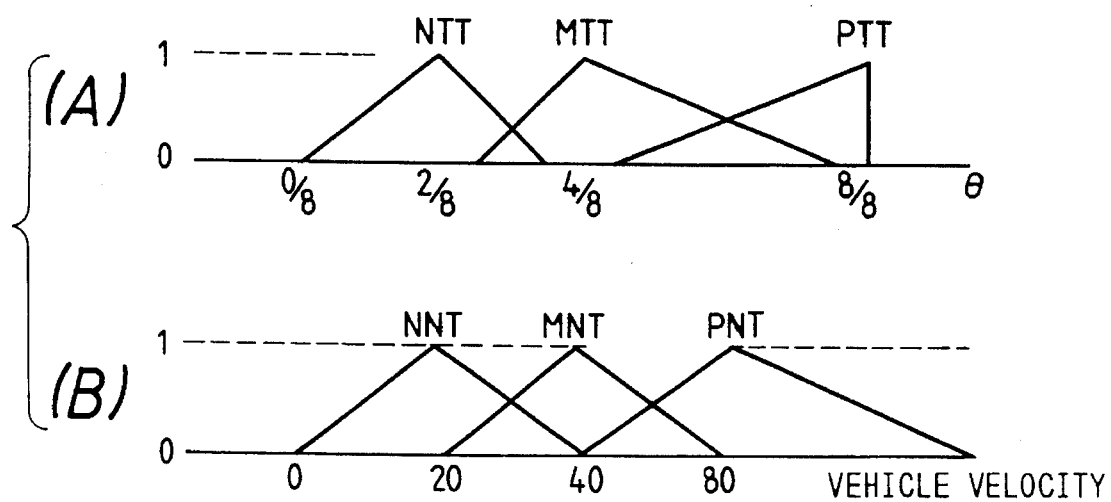
Figure 48:
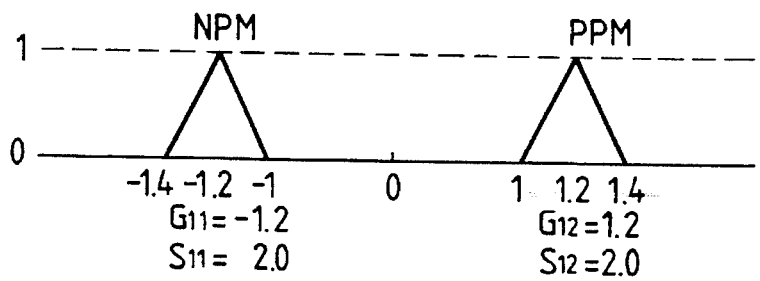
FIGS. 48 and 49 show membership functions of fuzzy logic rules 11 and 12.
Figure 49:
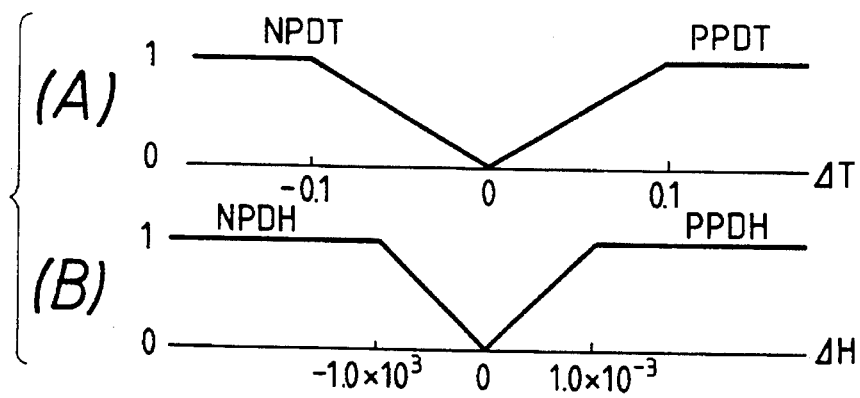

FIG. 44 shows a processing flow chart of the processor for calculating index value of acceleration response 3104, the memory of index value for target acceleration response 3105, the processor for comparing acceleration response 3106, and the processor for control parameter alteration 3107.

In a processor 4401, using the measured values of the engine revolution speed information 241, the primary pulley revolution speed information 251, and the secondary pulley revolution speed information 261, and the throttle opening information 231 at this time:

$\theta(0)$: throttle opening
$n_e(0)$: engine revolution speed,
$n_{in}(0)$: primary pulley revolution speed, and
$n_{out}(0)$: secondary pulley revolution speed, and the measured values $\theta(-n)$, $n_e(-n)$, $n_{in}(-n)$, and $n_{out}(-n)$ n×0.01 (n= 1, 2, ..., 11) seconds before, the microcomputer 511 determines the speed ratio velocity (di/dt):

$$(di/dt) = (n_{in}(0)/n_{out}(0) - n_{in}(-n)/n_{out}(-n))/0.01$$

and determines the moving average $(di/dt)^*$ of 10 values of (di/dt) 0.1 seconds before.

Figure 45:
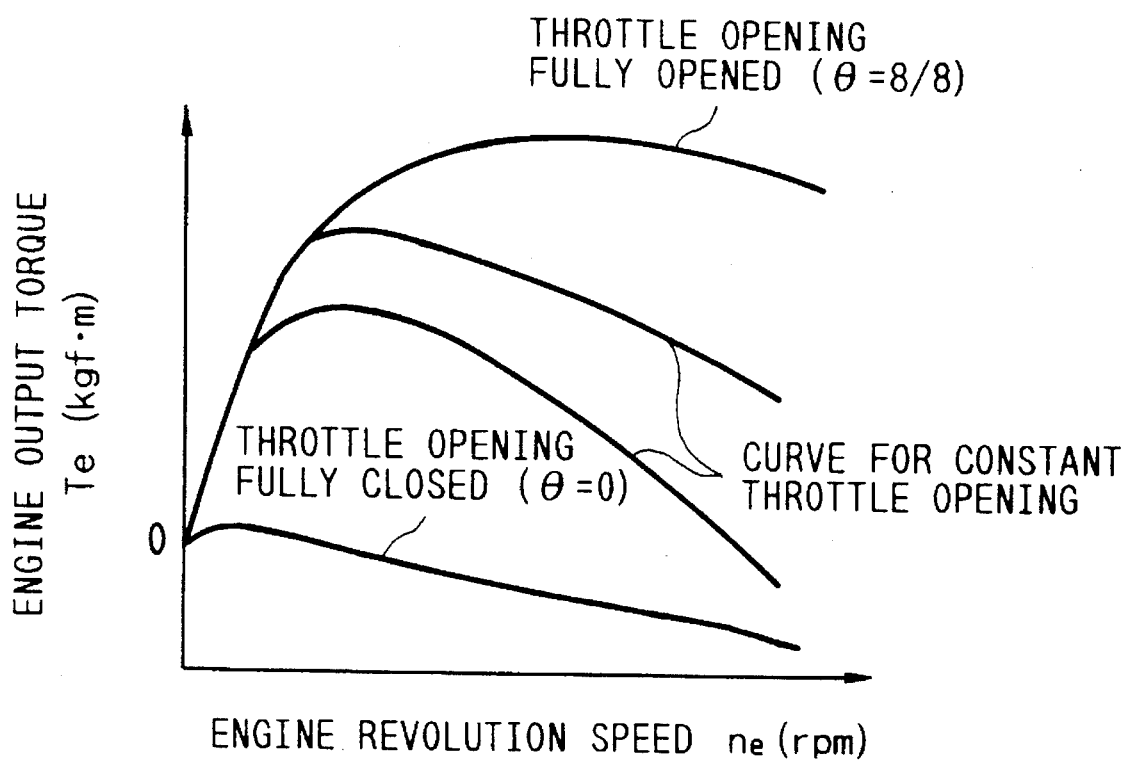
FIG. 45 is an engine output torque characteristic diagram.

Using the engine output torque $T_e$ calculated from the relational curves shown in FIG. 45 and the above measured values, the microcomputer 511 calculates the following:

$$h = n_e(0) \cdot I_e \cdot (di/dt) - T_e \cdot (n_{in}(0)/n_{out}(0))$$

Ie: Moment of inertia from the engine to the primary pulley

Using the value of h (h(-1)) calculated 0.01 seconds before, the microcomputer 511 determines the following one by one:

$$hf = h(0) - h(-1),$$

and goes to a processor 4402.

In the processor 4401, when hf< 0, the microcomputer 511 ends the calculation of h and stores h(-1) at this time as a maximum value.

In the judgment processor 4402, the microcomputer 511 judges whether the moving average of speed ratio velocity $(di/dt)^*$ satisfies the following condition:

$$|(di/dt)^*| < k_5 \text{ } (k_5 \text{: constant})$$

When the moving average does not satisfy the condition, the microcomputer 511 goes to the processor 3102. This processing is performed until the condition is satisfied.

When the moving average satisfies the above condition $|(di/dt)^*| < k_5$, the microcomputer 511 goes to a processor 4404. In the processor 4404, using t obtained by the judgment function for parameter $\theta$ alteration 3101, the microcomputer 511 calculates the following:

$$T = t\phi - t\theta - 0.05 \text{ [sec]}$$

tφ=Time when |(di/dt)*|<$k_4$ is satisfied and stores it as acceleration response time index value information T22. The microcomputer 511 outputs the maximum value of h obtained in the processor 4401 as acceleration down-shock index value information H23 and goes to a processor 4405.

In the processor 4405, the microcomputer 511 performs the processing "MFLAG←0" and goes to the memory of target acceleration response 3105.

There are three fuzzy logic rules available in the memory of target acceleration response 3105.

(Fuzzy logic rule 8)

When θT is large and $n_{out}$T is small, the response time is short and the down-shock is large.

(Fuzzy logic rule 9)

When θT is medium and $n_{out}$T is small, or

T is large and $n_{out}$T is medium, the response time is medium and the down-shock is small.

(Fuzzy logic rule 10)

When θT is large and $n_{out}$T is large, or

θT is small and $n_{out}$T is small, the response time is long and no down-shock occurs.

Using T15 and $n_{out}$T16 calculated by the judgment function for parameter alteration 3101, the microcomputer 511 calculates target acceleration response index values $T_o$20 and $H_o$21 on the basis of the above three fuzzy logic rules, and goes to the processor for comparing acceleration response 3106. The index value $T_o$ is related to the response time and determined from the following expression:

$$To = \frac{\sum_l y_l \cdot G_l \cdot S_l}{\sum_l y_l \cdot S_l}, \quad l = 8, 9, 10$$

Symbols $G_1$ and $S_1$ in the above expression indicate a gravity center and an area of the membership functions (see FIG. 46(A)) of the fuzzy rules 8, 9, and 10 such as:

the response time is short (NTM),
the response time is medium (MTM), and
the response time is long (PTM).

A symbol $y_l$ indicates the adaptation of each of NTM, MTM, and PTM. When the adaptation at θT and $n_{out}$T of the membership functions of the fuzzy logic rules 8, 9, and 10 shown below:

θT is small (NTT),
θT is medium (MTT),
θT is large (PTT),
$n_{out}$ is small (NTT),
$n_{out}$ is medium (MNT), and
$n_{out}$ is large (PNT), is expressed by $x_{20}, x_{21}, x_{22}, x_{23}, x_{24}$, and $x_{25}$, the adaptation $y_1$ is determined by the following expressions (see FIG. 47):

$y_8$=max($x_{22}, x_{23}$)

$y_9$=max[min($x_{21}, x_{23}$), min($x_{22}, x_{24}$)]

$y_{10}$=max[min($x_{20}, x_{23}$), min($x_{22}, x_{25}$)]

The index value $H_o$ is related to down-shock of the acceleration and determined from the following expression:

$$Ho = \frac{\sum_l y_l \cdot G_l' \cdot S_l'}{\sum_l y_l \cdot S_l'}, \quad l = 8, 9, 10$$

Symbols $G_l'$ and $S_l'$ in the above expression indicate a gravity center and an area of the membership functions (see FIG. 46(B)) of the fuzzy rules 8, 9, and 10 such as:

the down-shock is large (PHK),
the down-shock is small (NHK), and
no down-shock occurs (ZHK).

A symbol $y_l$ indicates the adaptation of each of PHK, NHK, and ZHK, and can be determined from calculation of the adaptation of the membership functions θT and $n_{out}$T of the fuzzy logic rules 8, 9, and 10.

In the processor for comparing acceleration response 3106, using the measured index values T22 and H23 outputted from the processor for calculating index value of acceleration response 3104 and the target index values $T_o$20 and $T_o$21 outputted from the memory of index value for target acceleration response 3105, the microcomputer 511 goes to the processor 3107 where the following values are calculated (ΔT24, ΔT25):

ΔT=T−$T_o$

ΔH=H−$H_o$

There are two fuzzy logic rules available in the processor for calculating control parameter alteration 3107.

(Fuzzy logic rule 11)

When ΔT> 0 and ΔH≦0, the microcomputer 511 changes the control parameter in the direction where the response time is shortened.

(Fuzzy logic rule 12)

When ΔT< 0 and ΔH≦0, the microcomputer 511 changes the control parameter in the direction where the response time is lengthened.

Using the information T24 and T25 outputted from the processor 3106, the microcomputer 511 determines the control parameter alteration P on the basis of the above two fuzzy logic rules, and goes to the processor 3102.

The alteration P is determined from the following expression:

$$P = \frac{\sum_m y_m \cdot G_m \cdot S_m}{\sum_m y_m \cdot S_m}, \quad m = 11, 12$$

Symbols $G_m$ and $S_m$ in the above expression indicate a gravity center and an area of the membership functions (see FIG. 48) of the fuzzy logic rules 11 and 12 such as:

the microcomputer 511 changes the control parameter in the direction where the acceleration response time is shortened (NPM), and the microcomputer 511 changes the control parameter in the direction where the acceleration response time is lengthened (PPM).

A symbol $y_m$ indicates the adaptation of each of NPM and PPM.

When the adaptation at ΔT and ΔH of the membership functions of the fuzzy logic rules 11 and 12 shown below:

ΔT is negative (NPDT),
ΔT is positive (PPDT),
ΔH is less than 0 (NPDH), and
ΔH is more than 0 (PPDH), is expressed by $x_{30}, x_{31}, x_{32}$, and $x_{33}$, the adaptation $y_m$ is determined by the following expressions (see FIG. 49):

$y_{11}$=max. ($x_{30}, x_{33}$)

$y_{12}$=max. ($x_{11}, x_{32}$)

On the basis of the calculated parameter alteration P26, the microcomputer 511 changes the operation instruction calculation parameter (line segment Pq of the membership function SNT shown in FIG. 43(B)) to the actuator.

Figure 50:
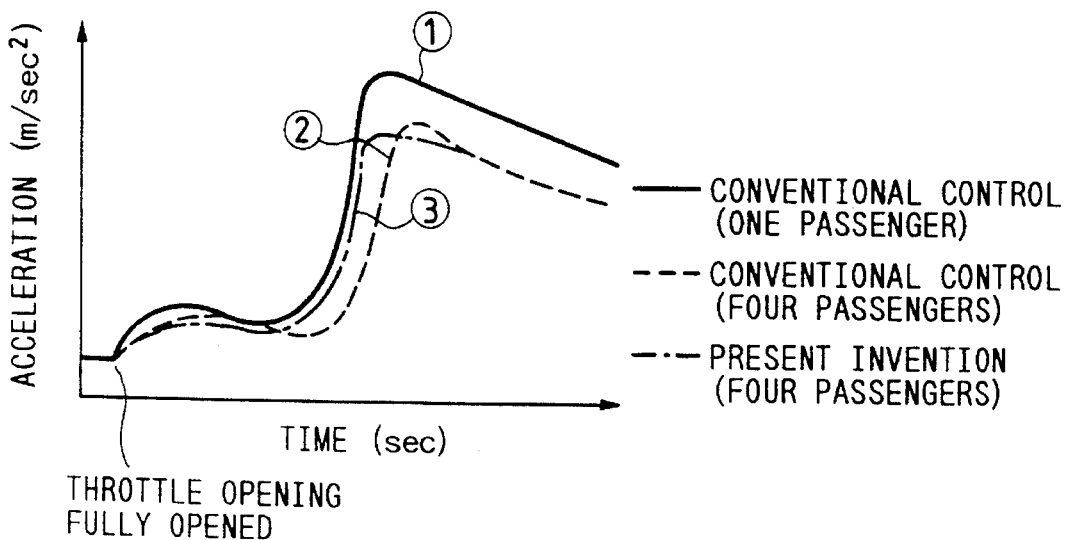
FIG. 50 is a comparison diagram between the conventional control method and the control method of the present invention.

To compare the control method of this embodiment with the conventional control method, the acceleration waveforms when the throttle opening is fully opened during stationary running of a vehicle velocity of 40 km/h when the vehicle weight is increased (the number of passengers is increased from 1 to 4) is shown in FIG. 50. Numeral ① indicates the acceleration waveform at the normal weight, ② the acceleration waveform when the conventional control method is used, and ③ the acceleration waveform when the control method of the present invention is used.

The drawing shows that when the conventional control method is used, the acceleration response time is lengthened due to an increase of vehicle weight, while when the control method of the present invention is used, no down-shock occurs in acceleration and the response time is shortened.

[Effects of the Invention]

The present invention obtains good results indicated below.

(1) When the speed ratio or the deviation between the target value and the actual value of the primary pulley revolution speed is small, the speed ratio is controlled accurately on the basis of the deviation and changes thereof with time. Therefore, the speed ratio and the engine revolution speed can be changed smoothly; that is, the speed ratio and the engine revolution speed are prevented from sudden changes, and the acceleration and deceleration and the fuel expense are prevented from degradation. When the deviation is large, the speed ratio is controlled by using the ratio between the predicting time until the deviation becomes 0 and the predicting response time necessary for stopping the speed change of the speed ratio control actuator. Therefore, the time when the deviation becomes 0 can be synchronized with the time when the speed change is stopped, the engine revolution speed can be prevented from overshooting, the acceleration up-shock can be prevented, and the acceleration and deceleration and the fuel expense are improved. When the deviation is large, the speed ratio is controlled by the derivative of acceleration. Therefore, sudden acceleration changes such as down-shock can be prevented, and the acceleration and deceleration are improved. When the deviation is small and the acceleration pedal position variation velocity is small, it is inhibited to change the speed ratio. Therefore, the sensitivity for minute changes of the throttle opening for speed ratio variation can be lowered, wasteful variations of the engine revolution speed can be prevented, and the fuel expense is lowered.

(2) The engine output is controlled on the basis of the variation prediction of the vehicle acceleration or the shaft torque of the drive wheel. Therefore, high speed response to acceleration and deceleration is compatible with smooth variations, and the drivability and riding comfort are improved. Particularly, the variation prediction of the vehicle acceleration or the shaft torque of the drive wheel is made by using the speed ratio, transmission input side revolution speed, and engine revolution speed. Therefore, effects of the speed ratio variation velocity can be eliminated by engine output control, and high velocity acceleration and deceleration without a sense of incompatibility can be realized. The above variation prediction is also made by using the throttle opening and the vehicle derivative of acceleration information. Therefore, acceleration down-shock and up-shock can be removed, and smooth acceleration and deceleration with rapid response can be realized. Since fuzzy logic is used for the above prediction and engine control, smooth and rapid acceleration and deceleration response can be realized.

By using the processing that finite speed transmission and continuously variable speed transmission are combined at an optional rate, the driver can find pleasure in finite speed ratio characteristics, continuously variable speed ratio characteristics, or optional intermediate speed ratio characteristics. When a vehicle with a finite speed automatic transmission is changed, the driver can be slowly become accustomed to continuously variable speed ratio characteristics without a sense of incompatibility by a vehicle using the present invention. The driver can find pleasure in an optional number of finite speeds (3, 4, 5, or more speeds). Since processing that the speed ratio velocity is corrected by using the information of a predicting time necessary for reaching target speed ratio is provided, the driver can easily obtain transient speed ratio characteristics as desired and the easiness of maneuverability can be improved.

(3) Even under the condition that the vehicle response characteristics are changed by changes of the running resistance such as the number of passengers and gradient and output reduction of the engine caused by air pressure changes, the best acceleration response in accordance with the vehicle velocity and the throttle opening is calculated as a target acceleration response, and the control parameter is changed on the basis of comparison result information between the target acceleration response calculated as described above and the measured acceleration response so that the acceleration response approaches the target value. Therefore, the acceleration reduction can be minimized.

Since the speed ratio control parameter is changed by using comparison result using the acceleration response time and the index value of down-shock magnitude, a smooth and rapid acceleration response with a short response time and little down-shock can be obtained.

Since the target acceleration response using fuzzy logic or the control parameter change value is calculated, a fine output value can be obtained for comparison result information between the vehicle velocity and the throttle opening or between the target acceleration response and the measured acceleration response.

What is claimed is:

1. In a vehicle transmission system including an operation sensor, a running status sensor, a processor and a memory storing relation data between target speed and data measured by use of said operation sensor and said running status sensor, a speed ratio control method for a continuously variable transmission which transfer inputs from a power source to a drive wheel, comprising the steps of;

measuring through said operation and said running status sensors, a driver's operation quantity and a vehicle running status;

determining through said processor, by use of said relation data, one of a target value of speed ratio and a target value of revolution speed on an input of said transmission on a basis of results of said measuring step; and changing a speed ratio using at least two different algorithms in correspondence with whether or not a value of deviation between said target value and a current actual value is greater than a threshold value.

2. A speed ratio control method for a transmission according to claim 1, wherein a changing in said changing step is performed on a deviation and velocity of deviation variation when an absolute value of said deviation is smaller than a predetermined value.

3. In a vehicle transmission system including an operation sensor, a running status sensor, a processor and a memory storing relation data between target speed and data measured by use of said operation sensor and said running status sensor, a speed ratio control method for a continuously variable transmission which transfer inputs from a power source to a drive wheel, comprising the steps of:

measuring through said operation and said running status sensors, a driver's operation quantity and a vehicle running status;

determining through said processor, by use of said relation data, one of a target value of speed ratio and a target value of revolution speed on an input of said transmission on a basis of results of said measuring step; and changing a speed ratio using at least two different algorithms in correspondence with whether or not a value of deviation between said target value and a current actual value is greater than a threshold value;

wherein at least one of said different algorithms uses fuzzy logic rules.

4. In a vehicle transmission system including an operation sensor, a running status sensor, a processor and a memory storing relation data between target speed and data measured by use of said operation sensor and said running status sensor, a speed ratio control method for a continuously variable transmission which transfer inputs from a power source to a drive wheel, comprising the steps of:

measuring through said operation and said running status sensors, a driver's operation quantity and a vehicle running status;

determining through said processor, by use of said relation data, one of a target value of speed ratio and a target value of revolution speed on an input of said transmission on a basis of results of said measuring step; and changing a speed ratio using at least two different algorithms in correspondence with whether or not a value of deviation between said target value and a current actual value is greater than a threshold value;

wherein said changing step is performed according to when an absolute value of said deviation is larger than a predetermined value, said speed ratio is changed based on an at least one of a vehicle acceleration value, and a value which is at least one of a ratio and difference between a predicted time until said deviation becomes 0, and a predicted response time necessary for stopping a speed by use of a speed ratio control actuator.

5. In a vehicle transmission system including an operation sensor, a running status sensor, a processor and a memory storing relation data between target speed and data measured by use of said operation sensor and said running status sensor, a speed ratio control method for a continuously variable transmission which transfer inputs from a power source to a drive wheel, comprising the steps of:

measuring through said operation and said running status sensors, a driver's operation quantity and a vehicle running status;

determining through said processor, by use of said relation data, one of a target value of speed ratio and a target value of revolution speed on an input of said transmission on a basis of results of said measuring step; and changing a speed ratio using at least two different algorithms in correspondence with whether or not a value of deviation between said target value and a current actual value is greater than a threshold value;

wherein said changing step further comprises: when both an acceleration pedal position variation velocity and an absolute value of said deviation between said target value and the actual value are smaller than predetermined values, said speed ratio is not changed.

6. In a vehicle including an operation sensor, a running status sensor, a processing means and a memory storing relation data between target speed and data measured by use of said operation sensor and said running status sensor, a speed ratio control system of a continuously variable transmission which transfers inputs from a power source to a drive wheel, comprising:

means for measuring a driver's operation quantity and a vehicle running status;

means for determining one of a target value of speed ratio and a target value of revolution speed on an input of said transmission on a basis of results from said means for measuring; and means for changing a speed ratio using at least two different algorithms in correspondence with whether or not a value of deviation between said target value and a current actual value is greater than a threshold value.

* * * * *